US011532237B2

(12) United States Patent
Tiana et al.

(10) Patent No.: US 11,532,237 B2
(45) Date of Patent: Dec. 20, 2022

(54) AUTONOMOUS AIRCRAFT SENSOR-BASED POSITIONING AND NAVIGATION SYSTEM USING MARKERS

(71) Applicant: Rockwell Collins, Inc., Cedar Rapids, IA (US)

(72) Inventors: Carlo L. Tiana, Portland, OR (US);
Eric N. Anderson, Marion, IA (US);
Weston J. Lahr, Sherwood, OR (US);
Geoffrey A. Shapiro, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 556 days.

(21) Appl. No.: 16/288,770

(22) Filed: Feb. 28, 2019

(65) Prior Publication Data

US 2020/0279494 A1 Sep. 3, 2020

(51) Int. Cl.
*G08G 5/00* (2006.01)
*G06T 7/70* (2017.01)
(Continued)

(52) U.S. Cl.
CPC ............ *G08G 5/0069* (2013.01); *G01C 3/14* (2013.01); *G01S 13/865* (2013.01);
(Continued)

(58) Field of Classification Search
None
See application file for complete search history.

(56) References Cited

U.S. PATENT DOCUMENTS

| 2010/0174426 A1* | 7/2010 | Turung | G05D 1/0061 |
| | | | 701/19 |
| 2012/0143808 A1* | 6/2012 | Karins | G06N 7/005 |
| | | | 706/46 |

(Continued)

FOREIGN PATENT DOCUMENTS

| EP | 2219219 A1 | 8/2010 |
| EP | 2234088 A2 | 9/2010 |
| EP | 2557552 A1 | 2/2013 |

OTHER PUBLICATIONS

Extended Search Report dated Mar. 9, 2020 for EP Application No. 19208911.8.
Office Action mailed in European Application No. 19208911.8 dated Dec. 9, 2021, 6 pages.
Office Action mailed in European Application No. 19208911.8 dated Jul. 23, 2021, 8 pages.

*Primary Examiner* — Adam D Tissot
*Assistant Examiner* — Garrett F Evans
(74) *Attorney, Agent, or Firm* — Suiter Swantz pc llo

(57) ABSTRACT

A system and method are disclosed for design of a suite of multispectral (MS) sensors and processing of enhanced data streams produced by the sensors for autonomous aircraft flight. The onboard suite of MS sensors is specifically configured to sense and use a MS variety of sensor-tuned objects, either strategically placed objects and/or surveyed and sensor significant existing objects to determine a position and verify position accuracy. The received MS sensor data enables an autonomous aircraft object identification and positioning system to correlate MS sensor data output with a-priori information stored onboard to determine and verify position and trajectory of the autonomous aircraft. Once position and trajectory are known, the object identification and positioning system commands the autonomous aircraft flight management system and autopilot control of the autonomous aircraft.

16 Claims, 17 Drawing Sheets

(51) Int. Cl.
  *G06F 16/29* (2019.01)
  *G01S 13/935* (2020.01)
  *G01C 3/14* (2006.01)
  *G01S 13/86* (2006.01)
  *G01S 17/933* (2020.01)
  *G05D 1/10* (2006.01)

(52) U.S. Cl.
  CPC .......... *G01S 13/867* (2013.01); *G01S 13/935* (2020.01); *G01S 17/933* (2013.01); *G05D 1/101* (2013.01); *G06F 16/29* (2019.01); *G06T 7/70* (2017.01); *G08G 5/0039* (2013.01); *G06T 2207/10012* (2013.01); *G06T 2207/10036* (2013.01); *G06T 2207/10044* (2013.01)

(56) References Cited

U.S. PATENT DOCUMENTS

| | | | |
|---|---|---|---|
| 2013/0325215 | A1 | 12/2013 | Vos et al. |
| 2017/0069214 | A1* | 3/2017 | Dupray .............. H04B 7/18506 |
| 2017/0083748 | A1* | 3/2017 | Zhou ....................... G06V 20/13 |
| 2017/0269611 | A1* | 9/2017 | Rangarajan ........... B64C 39/024 |
| 2017/0275023 | A1* | 9/2017 | Harris ...................... G06T 7/593 |
| 2019/0034868 | A1* | 1/2019 | Konanur ............ G06Q 10/0832 |
| 2020/0050217 | A1* | 2/2020 | Rose ........................ H04N 7/181 |
| 2020/0130864 | A1* | 4/2020 | Brockers ................. B60L 53/37 |
| 2020/0258400 | A1* | 8/2020 | Yuan .................... G05D 1/0676 |

* cited by examiner

AUTONOMOUS AIRCRAFT SENSOR-BASED POSITIONING AND NAVIGATION SYSTEM USING MARKERS

CROSS-REFERENCE TO RELATED APPLICATIONS

The present application is related to the following U.S. patent applications:

U.S. patent application Ser. No. 16/288,407 filed Feb. 28, 2019 entitled "Multispectrally Enhanced Synthetic Vision Database System and Method", U.S. patent application Ser. No. 16/288,531 filed Feb. 28, 2019 entitled "Design and Processing of Multispectral Sensors for Autonomous Flight", and U.S. patent application Ser. No. 16/289,786 filed Mar. 1, 2019 entitled "Guidance Deviation Derivation from High Assurance Hybrid Position Solution System and Method", the contents of which above-named U.S. patent applications are herein incorporated by reference in their entirety.

BACKGROUND

Traditionally, a human pilot must maintain a visual reference with a landing environment before safely and legally operating an aircraft below a specific visibility-based published minimum altitude. The human pilot must be able to visually acquire the runway, approach lighting system (ALS), or another associated visual reference before descending below the published minimum altitude for the specific approach to the specific runway. The human pilot uses visual reference with the landing runway to make a safe landing. From experience, the pilot may visually determine a range from the runway as well as if the aircraft is on centerline and glideslope. This experienced "eye" for maneuvering relative to a target object allows the human pilot to visually interpret a plurality of inputs and make decisions based on those visual inputs.

Synthetic vision systems (SVS) may enable a human pilot to safely land an aircraft without outside visual reference to a landing environment. For generating imagery to a human pilot, such SVS may receive information from a database or receive actual real time imagery from a sensor camera mounted externally on the aircraft.

Data received by the SVS sensor must be processed and formatted for human consumption. Such processing may require extensive processing power as well as filtering of some information in order to display accurately to the human pilot. Traditional sensor system design is driven by the need to produce "natural looking" images to pilots, requiring the complex and often information-occluding task of forming visually pleasant imagery.

Infrastructure within the National Airspace System (NAS) has been traditionally configured for human consumption. The ALS is illuminated for human eyes, the Instrument Landing System (ILS) information transmits localizer and glideslope for human display, radio towers have flashing lights to visually alert the human pilot. All are examples of expensive and maintenance consuming human oriented visual and radio frequency infrastructure elements designed for human consumption.

Therefore, a need remains for a system and related method for configuring a multispectral (MS) sensor suite onboard an autonomous aircraft specifically designed for sensing of, and positioning relative to, a variety of sensor tuned objects strategically placed or surveyed to aid an autonomous aircraft in positioning and trajectory verification and control.

SUMMARY

In one aspect, embodiments of the inventive concepts disclosed herein are directed to a system for multispectral sensor-based positioning. The system may comprise a multispectral (MS) sensor suite onboard an autonomous aircraft including a vision system (VS), a radio frequency (RF) radio detection and ranging (RADAR) system, a laser imaging detection and ranging (LIDAR) system, and a mapping system. For processing data, the system may include an object identification (ID) and positioning system associated with the MS sensor suite, the object identification and positioning system including a processor and a storage. For data storage, the system may include a MS database within the storage configured to communicate with the processor with the processor, the MS database including a plurality of historical object data defining an associated plurality of objects.

For control of the object ID and positioning system, the system may include a tangible, non-transitory memory within the storage configured to communicate with the processor, the tangible, non-transitory memory having instructions stored therein that, in response to execution by the processor, cause the processor to execute commands. The object ID and positioning system may receive a flight plan, the flight plan including a desired path and a desired destination object and receive sensor data from sensor of the autonomous aircraft sensor suite, the sensor data including an attribute of a sensed object.

The object ID and positioning system may compare the received attribute to the historical object data and identify the sensed object if the attribute comparison results in a match. The object ID and positioning system may also determine one of a bearing, a range, and an altitude delta (BRA) between the identified object and the autonomous aircraft and determine a position and a trajectory of the autonomous aircraft based on the identification of the sensed object and the BRA. The object ID and positioning system may further verify the position matches the desired path or the desired object and command an autopilot to manipulate an autonomous aircraft flight control based on one of the position, the trajectory, and the verification.

Another embodiment of the inventive concepts disclosed herein may be directed to a method for multispectral sensor-based positioning of an autonomous aircraft. The method may comprise receiving a flight plan, the flight plan including a desired path and a desired destination object and receiving sensor data from a sensor of an autonomous aircraft sensor suite, the sensor data including an attribute of a sensed object. The method may include comparing the received attribute to a historical object data within an onboard multispectral database and identifying the sensed object if the attribute comparison results in a match.

The method may include determining one of a bearing, a range, and an altitude delta (BRA) between the identified object and the autonomous aircraft and determining a position and a trajectory of the autonomous aircraft based on the identification of the sensed object and the BRA. The method may further include verifying the position matches one of the desired path or the desired object and commanding an autopilot to manipulate an autonomous aircraft flight control based on one of the position, the trajectory, and the verification.

It is to be understood that both the foregoing general description and the following detailed description are exemplary and explanatory only and are not necessarily restrictive of the inventive concepts as claimed. The accompanying drawings, which are incorporated in and constitute a part of the specification, illustrate embodiments of the inventive concepts and together with the general description, serve to explain the principles of the inventive concepts disclosed herein.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function.

In the drawings in which.

DETAILED DESCRIPTION OF EXEMPLARY EMBODIMENTS

Figure 1:
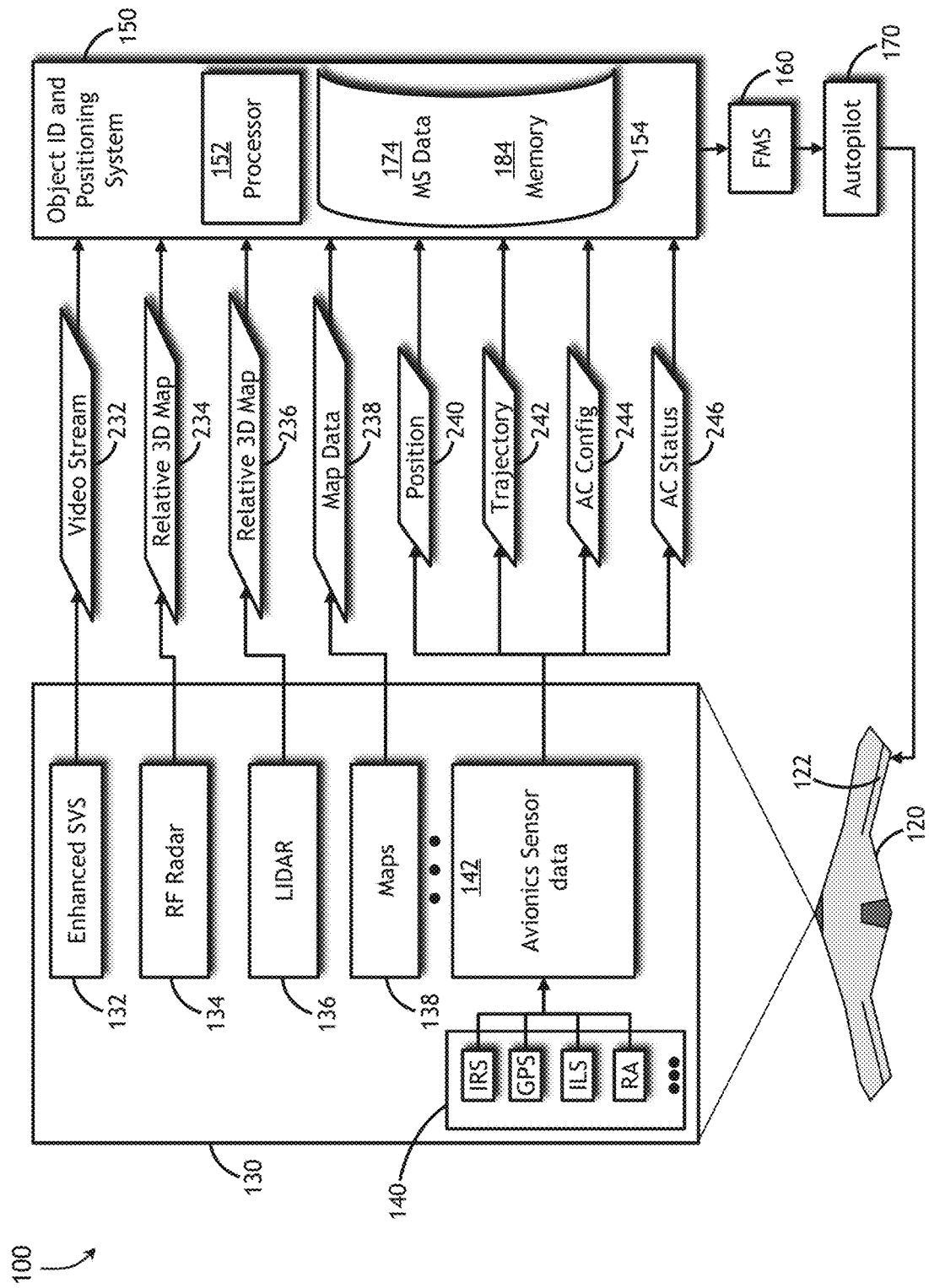
FIG. 1 is a diagram of a multispectral sensor positioning system in accordance with an embodiment of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Overview

Broadly, embodiments of the inventive concepts disclosed herein are directed to a system and method are disclosed for design of a suite of multispectral (MS) sensors and processing of enhanced data streams produced by the sensors for autonomous aircraft flight. The onboard suite of MS sensors is specifically configured to sense and use a MS variety of sensor-tuned objects, either strategically placed objects and/or surveyed and sensor significant existing objects to determine a position and verify position accuracy. The received MS sensor data enables an autonomous aircraft object identification and positioning system to correlate MS sensor data output with a-priori information stored onboard to determine and verify position and trajectory of the autonomous aircraft. Once position and trajectory are known, the object identification and positioning system commands the autonomous aircraft flight management system and autopilot control of the autonomous aircraft.

| Reference Chart | |
|---|---|
| 100 | Multispectral System |
| 120 | Autonomous Aircraft |
| 122 | Flight Control Surface |
| 124 | Port Stereoscopic Camera |
| 126 | Starboard Stereoscopic Camera |
| 130 | Sensor Suite |
| 132 | Enhanced SVS |
| 134 | RF RADAR System |
| 136 | LIDAR System |
| 138 | Maps System |
| 140 | Avionics Sensors |
| 142 | Avionics Sensor Data |
| 150 | Object ID and Positioning System |
| 152 | Processor |
| 154 | Storage |
| 160 | Flight Management System |
| 170 | Autopilot |
| 174 | Multispectral Database |
| 184 | Memory |
| 200 | Diagram of Sensor Data |
| 220 | MS Position Aids |
| 222 | Opportunity Position Aids |
| 224 | Installed Position Aids |
| 232 | Video Stream |
| 234 | RADAR Relative Map |
| 236 | LIDAR Relative Map |
| 238 | Map Data |
| 240 | Position |
| 242 | Trajectory |
| 244 | Aircraft Configuration |
| 246 | Aircraft Status |
| 300 | MS Sensor System Logic |
| 302 | Receive sensor data |
| 304 | Flight Analysis |
| 306 | Determine Sensor Hierarchy |
| 308 | Detect/ID Object |
| 310 | Object Purpose |
| 312 | Determine Object BRA |
| 314 | Determine Position Trajectory |
| 316 | Read Position Aid |
| 318 | Verify Position |
| 350 | Sensor Hierarchy Factors |
| 400 | MS Sensors Method |
| 402 | Receive Flight Plan |
| 404 | Receive Sensor Data |
| 406 | Compare Attributes |
| 408 | Identify Sensed Object |
| 410 | Determine Position Trajectory |
| 412 | Verify Position |
| 414 | Command Autopilot |
| 500 | PAJN Arrival View |
| 502 | Neighborhood |
| 504 | PAJN RW26 Threshold |
| 506 | Marina |
| 508 | Sensor Line of Sight |
| 510 | Bridge Center |
| 512 | Pier T |
| 514 | Left 10 Mile Marker |
| 516 | Right 10 Mile Marker |
| 518 | Right 5 Mile Marker |
| 520 | Salmon Hatchery |
| 522 | Coghlan Island |
| 524 | Auke Mountain |
| 526 | Juneau Hill |
| 528 | Blast Pad Markings Corner |
| 530 | Aiming Point Markings |
| 532 | Hold Short Line |
| 534 | Sequenced Flashing White |
| 536 | Centerline Bars White |
| 538 | 1000 Ft Bar White |

| Reference Chart | |
|---|---|
| 540 | Side Row Bar Red |
| 542 | Threshold Green |
| 544 | Threshold Markings |
| 546 | Designation Number |
| 548 | TDZ Markings |
| 550 | Centerline |
| 552 | Edge Markings |
| 554 | KRAP Taxiway A |
| 556 | KRAP Terminal |
| 588 | Sensor Significant Object |
| 600 | PAJN Approach View |
| 626 | Tongass Mountain |
| 652 | KLAS RW 19L |
| 654 | Blast Fence East |
| 656 | Road Intersection |
| 658 | KLAS RW 19R |
| 660 | Hotel NE Corner |
| 662 | Hotel HVAC |
| 664 | KLAS Taxiway H |
| 666 | Blast Fence West |
| 668 | Hangar South |
| 670 | Casino South |
| 700 | Salmon Hatchery Aspect Views |
| 720 | Boat Dock |
| 722 | Boat Dock Corner W |
| 724 | Boat Dock Corner NW |
| 726 | Boat Dock Corner NE |
| 728 | Boat Dock Corner SE |
| 740 | Hatchery Ponds |
| 750 | Long Pier |
| 800 | Final Approach View PAJN |
| 900 | PAJN Short Final View |
| 920 | Left MS Runway Ident |
| 922 | Right MS Runway Ident |
| 950 | PAJN Airport Diagram |
| 1000 | KRAP Short Final View |
| 1004 | KRAP RW32 |
| 1050 | KRAP Airport Diagram |
| 1100 | KRCA Short Final View |
| 1104 | KRCA RW31 |
| 1150 | KRCA Airport Diagram |
| 1154 | KRCA Taxiway A |
| 1200 | ALSF 2 Diagram |
| 1250 | ALSF 2 Table |
| 1300 | Stereoscopic Camera View |
| 1400 | KLAS Short Final View |
| 1450 | KLAS Airport Diagram |
| 1500 | KLAS Short Final IFR |
| 1600 | Runway Aspect Views |
| 1602 | Approach End |
| 1604 | Departure End |
| 1610 | Above Glidepath Aspect |
| 1620 | On Glide Path Aspect |
| 1630 | Below Glide Path Aspect |
| 1650 | Visual Glide Slope Indicator |
| 1700 | Formation Flight View |
| 1720 | Lead Aircraft Object |
| 1722 | Lead Aircraft ID Number |

FIG. 1 Hardware

Referring to FIG. 1, a diagram of a multispectral sensor positioning system in accordance with an embodiment of the inventive concepts disclosed herein is shown. A MS system 100 may enable an autonomous aircraft 120 to receive sensor data from a plurality of sensors within a sensor suite 130. Within the sensor suite 130, a vision system (VS) 132, a RF RADAR system 134, a LIDAR system 136, a maps system 138 and an avionics suite 140 may provide sensor data to an object identification (ID) and positioning system 150. Avionics sensor data 142 may include data generated by an Inertial Reference System (IRS), a Global Positioning System (GPS), an Instrument Landing System (ILS), and a Radio Altimeter system (RA). Contemplated herein, additional avionics sensors may be beneficial to the object ID and positioning system 150 for used in accordance with embodiment described herein.

Further, the object ID and positioning system 150 may include a processor 152 and a storage 154. The storage 154 may comprise a MS database 174 which may be functional to store a plurality of historical attributes associated with each object. Storage 154 may also include a memory 184 functional to house operational commands for the processor 152. The object ID and positioning system 150 may process sensor data and supply positioning and trajectory information to an autonomous aircraft FMS 160, The FMS 160 may then command an autopilot 170 to manipulate one or more flight controls 122 of the autonomous aircraft 120. Flight controls 122 may include traditional roll, pitch, and yaw controls such as an aileron, elevator, and rudder. However, a plurality of hybrid flight controls (e.g., spoilers, split rudders, differential drag devices, differential thrust, elevon, etc.) may fall within the scope of the inventive concepts disclosed herein.

In one embodiment of the inventive concepts disclosed herein, the sensor suite 130 may include a plurality of sensors configured for providing information to the object ID and positioning system 150. An operator may select one or more sensors to accomplish a specific mission yet minimize size, weight, power and cost. Each sensor suite may span a large swath of the electromagnetic spectrum allowing atmospheric penetration in the relevant ranges of approximately 1 to 10 km. Sensors which may operate in the Visual Spectrum, from approximately 450 to 700 nm, in the Near-Infrared (NIR) spectrum of approximately 750 to 950 nm, in the Short-Wave Infrared (SWIR) spectrum operating approximately in the 1-2 μm spectral band and thermal infrared sensors operating in the 3 to 5 μm and 7 to 15 μm bands may fall within the scope of the inventive concepts disclosed herein.

These sensors may support frame rates of a minimum required of about 10 Hz and up to 400 Hz, or more. Other sensors may operate in the Radio-Frequency bands, from X to W band, from 10 GHz to 220 GHz and operate in pulsed or Frequency Modulated Continuous Wave (FMCW) RADAR mode, with frame update rates of a minimum of 10 Hz and up to 30 Hz or higher, potentially scanning a "region of interest" within the total field of view. Each of these sensors may provide "Enhanced Vision System" capabilities to a modern cockpit. Another type of "synthetic" image may be computer generated from an onboard a-priori database and is typically referred to as a "Synthetic Vision System (SVS)". Each of these sources of positioning information may be combined into a "Combined Vision System (CVS)" which may present to a human pilot flying (onboard and remote), and to an autonomous aircraft pilotage system, an overall reliable and assured view of the operating environment in all visibility conditions.

In embodiments, sensor data may include an object attribute such as an object identification (name, reference, etc.), a position of the object with reference to a datum, an altitude of the object (mean sea level and above ground level), and a bearing, range, and altitude (BRA) of the object relative to the autonomous aircraft 120. The datum may be defined as a vertical geodetic reference datum (altitude) and a horizontal geodetic reference datum (latitude, longitude, grid).

An attribute of the sensed object may include a plurality of characteristics of the sensed object which may define the sensed object. Some exemplary attributes may include a shape, a size, a texture, a reflectivity level, a radar cross section, a color, and a three-dimensional position relative to the datum.

The object ID and positioning system 150 may be configured to receive sensor data from one or more sensors of the sensor suite 130 where the sensor data may include the plurality of attributes associated with a sensed object. Here, a sensed object may be defined as any object within a field of view (FOV) of one of the sensors and able to be imaged and therefore measured by the sensor. Also, a sensed object may include a terrain object, a geographical object, a natural object, a man-made object, an airport prepared surface, and a landing surface. An attribute of the sensed object may include characteristics of the sensed object which may highlight the object to the specific sensor.

For example, a desired object may include any object to which or from which an operator of the autonomous aircraft 120 may desire navigation or positioning. Here, an object may include a sensor significant object able to be sensed by any of the sensors within the sensor suite 130. For example, a desirable object may include a building, a road intersection, a RADAR significant object, a flight deck, an aircraft, and a target of interest. Each sensed object may inherently possess a plurality of attributes which may describe the object.

For example, an attribute of a sensed object may include an object three-dimensional position relative to the datum (e.g., latitude, longitude, MSL altitude), a visibly distinct difference from surrounding terrain (e.g., color texture, size, terrain flow), a RADAR cross section (RCS), a specific map feature, a shape, a size, a reflectivity level, a radar cross section, and a frequency of RF radiation. Each sensor within the sensor suite 130 may sense a specific attribute of an object and operate solely (positioning) or in concert (hybrid positioning) to assist the object ID and positioning system 150 in determining a precise position of the autonomous aircraft 120.

Optical Sensors

The MS system 100 may include a plurality of optical sensors included within the VS 132. The VS 132 may include a plurality of components and capabilities. One component of the VS 132 may include a Synthetic Vision System (SVS) configured to receive data from a database and provide database generated attributes to the object ID and positioning system 150 for use in positioning. Another component of the VS 132 may include an Enhanced Vision System (EVS) including a camera sensor of a plurality of wavelengths and providing those camera sensed attributes to the object ID and positioning system 150. Additionally contemplated herein, a Combined Vision System (CVS) may incorporate within the VS 132 to provide a synthesis of both database attributes with camera sensed attributes offered to the object ID and positioning system 150 for analysis and autonomous aircraft 120 position determination.

For example, the enhanced SVS 132 may be capable of imaging a specific pattern of terrain such as a mountain range, a runway pattern, a river, or a river valley. In one embodiment, the enhanced SVS 132 may function receiving data from the MS database 174 coupled with additional positioning sensors, offering object attributes to the object ID and positioning system 150 for precise positioning of the autonomous aircraft 120. In additional embodiments, the enhanced SVS 132 may employ a camera to image surrounding objects and offer the sensed data via a video stream data 232 to the object ID and positioning system 150.

One attribute of the terrain or runway object may be its distinct difference from surrounding terrain. Coupled with a terrain database within the MS database 174, the enhanced SVS 132 by itself may offer precise positioning ability to the autonomous aircraft 120 based on a single bearing and range from the known position of the known (historical attributes) object or a triangulation of bearings from two or more optically sensed objects.

In one embodiment of the inventive concepts disclosed herein, the sensor suite 130 may employ sensors configured for passive reception of light energy. Sensor suite 130 may employ a plurality of light sensors capable of imaging a plurality of light frequencies and wavelengths. Here, a light sensor or combination of light sensors configured for imaging objects which project light with the above characteristics may fall within the enhanced SVS 132 to provide sensor data to the object ID and positioning system 150.

An exemplary table of colors and characteristics of light may be functional with sensors configured for the autonomous aircraft 120:

| Color | Wavelength (nm) | Frequency (THz) |
| --- | --- | --- |
| Infrared | >1000 | <300 |
| Red | 700 | 428 |
| Orange | 620 | 484 |
| Yellow | 580 | 517 |
| Green | 530 | 566 |
| Cyan | 500 | 600 |
| Blue | 470 | 638 |
| Violet | 420 | 714 |
| Near Ultraviolet | 300 | 1000 |
| Far Ultraviolet | <200 | >1500 |

Contemplated herein, an active illuminator of a plurality of light frequencies may function within one embodiment of the inventive concepts disclosed herein, the reflected illumination (e.g. IR landing light) reflected to one of the light sensors may provide the object ID and positioning system 150 with valuable information in certain environments (e.g., night visual conditions).

In one embodiment of the inventive concepts disclosed herein, the sensor suite 130 may be comprised of a plurality of MS sensors. Here, a plurality of sensors capable to receive energy within a plurality of IR bands may function within the scope of the invention. For example, sensors configured for shortwave IR, longwave IR, visible colors, near and far UV, and a sensor capable to discern a signal with a wavelength of greater than 1000 nm and a frequency of approximately 300 THz may fall within the scope of the concepts herein.

Radar

The RF RADAR system 134 may include a plurality of RADAR types and systems for object detection and object identification. Some exemplary radar systems may include an imaging RADAR system of 10 to 100 GHz configured for ground mapping and detection of radar significant objects. For example, a synthetic aperture radar (SAR) and an Inverse synthetic aperture radar (ISAR) may function within the scope of the inventive concepts herein.

The RF RADAR system 134 may also operate solely as a positioning system, capable of generating a relative 3D map data 234 and provide the data to the object ID and positioning system 150 for BRA determination from a single known object or a BRA triangulation from two or more sensed objects. Also, the RF RADAR system 134 may function to complement each of the other sensors within the sensor suite 130. A RADAR significant object having a RADAR cross section (RCS) measurable by the RF RADAR system 134 sensor may be one example of an object sensed by the RF RADAR system 134. Depending on RF RADAR system 134 sensitivity, an object with a high RCS or low RCS may be a desirable object to use by the object ID and positioning system 150 for precise positioning.

For example, an electrical grid hub of converging towers and wires may be exceptionally visible to the RF RADAR system 134. Compared with historical positioning data within the MS database 174, the object ID and positioning system 150 may determine the precise position based on BRA information as well as an aircraft trajectory and speed from position data over time. Sensed RADAR data compared with RCS attributes of historical objects within the MS database 174 may offer precise triangulation positioning capabilities based solely on returns from the RF RADAR system 134. Combined with the relative 3D map data 234, the object ID and positioning system 150 may determine the precise position based on sensed data from one or more of the additional sensors within the sensor suite 130.

LiDAR

The sensor suite may also employ the LIDAR system 136 to sense objects nearby the autonomous aircraft 120. Transmitted laser energy from the LIDAR system 136 may be reflected and received to produce the LIDAR relative 3D map data 236. The LIDAR 3D map data 236 may provide a detailed snapshot of sensed objects within the FOV of the LIDAR system 136. As a sole positioning source, or in combination with the additional sensors, the LIDAR system 136 may supply the LIDAR relative 3D map data 236 to the object ID and positioning system 150 allowing the object ID and positioning system 150 to determine positioning and trajectory information based on the sensed object BRA from the autonomous aircraft 120.

Maps

Map system 138 may function to provide the object ID and positioning system 150 with detailed ground map data 238 from an area relevant to autonomous aircraft 120. Combined with inputs from onboard positioning systems, the object ID and positioning system 150 may receive the map data from the MS database 174 and correlate the map data with received sensor data to determine the precise position.

For example, the map data may include an airport diagram including runways, taxiways, and buildings (e.g., hangars). The object ID and positioning system 150 may correlate the precise position with the map data 238 to navigate the autonomous aircraft 120 to a position for possible landing on one of the runways. Further, during a taxi phase, the object ID and positioning system 150 may determine the precise position of the autonomous aircraft 120 based on received sensor data correlated with the airport diagram of the taxiways.

Avionics

In one embodiment of the inventive concepts disclosed herein, the avionics suite 140 may operate to provide the object ID and positioning system 150 with traditional avionics sensor data 142 allowing the object ID and positioning system 150 to correlate the avionics sensor data with additional sensor data to determine the precise position. An inertial reference system (IRS) may function as a traditional inertial system to offer accurate positioning information to the object identification and positioning system 150.

A global positioning system (GPS) may offer similar, likely more accurate, positioning information to the object identification and positioning system 150. Here, the term GPS may refer to all satellite-based positioning and timing systems. The generic term GPS is used here for descriptive purposes only and may not limit the use of additional satellite-based systems for the object ID and positioning system 150 to determine the precise position.

Each of the IRS and the GPS may offer position data 240 for the object ID and positioning system 150 to use as one source of positioning information. In addition, IRS and GPS data over time may offer trajectory data 242 to the object ID and positioning system 150. Autonomous aircraft 120 configuration data 244 as well as autonomous aircraft 120 status data 246 may aid the object ID and positioning system 150 in determining the precise position.

In embodiments, an ILS system may provide the object ID and positioning system 150 with accurate localizer and glideslope information relative to a desired runway. By itself, the ILS system has traditionally and accurately guided aircraft to runways. However, working in cooperation with the object identification and positioning system 150, the ILS may offer accurate positioning information relative to a runway and increase the accuracy of the precise position.

In one embodiment of the inventive concepts disclosed herein, a Radio Altimeter (RA) system may operate similar to a traditional manner offering precise altimetry within a threshold AGL altitude. For example, if the autonomous aircraft 120 is operating at or below an exemplary 2,000 ft AGL, the RA may offer range data from the autonomous aircraft 120 to the surface below. Especially during landing operations, the RA system may become a valuable source of AGL altitude information available to the object ID and positioning system 150 and the FMS 160.

However, each of the avionics suite 140 systems may possess inherent limitations. A GPS signal may be jammed or unavailable. A glideslope portion or the entirety of an ILS system may be inoperative requiring alternate procedures. Each of these limitations may require reliance on other positioning systems and sensors for the object ID and positioning system 150 to determine the precise position. Nevertheless, when operable, each of the avionics sensors 140 may offer valuable avionics sensor data 142 to the object ID and positioning system 150 to complement the precise position.

In one embodiment of the inventive concepts disclosed herein, the object ID and positioning system 150 may store the received sensor data in the MS database 174 within the storage. The MS database 174 may receive this new information and add the new information to historical object data. The historical object data may include specific attributes defining the object. For example, position, altitude, and size may be specific attributes defining an object. The object ID and positioning system 150 may compare the received sensor data to the historical object data and identify the sensed object based on the comparison. Should the object ID and positioning system 150 make a match between the sensed data and the historical data, the object ID and positioning system 150 may positively identify the object and, therefore, determine the precise position of the autonomous aircraft 120 relative to the sensed object.

Of note, each individual sensor within the sensor suite 130 may offer more accurate sensor data at differing ranges and altitudes. For example, at an altitude of 45,000 ft MSL (FL450), the GPS may be the most accurate of the sensors while at 110 ft AGL, the VS 132 may offer the most accurate set of data to the object ID and positioning system 150. Acting in concert, the sensor suite 130 may offer the precise positioning solution at all altitudes.

In one embodiment of the inventive concepts disclosed herein, the MS sensor suite may produce a data stream including an actual sensor return of a sensed object including each detail of an image without a perspective transformation. In this manner, the MS sensor suite 130 may produce a stream of raw data to the object ID and positioning system 150 to enable accurate positioning and trajectory. For example, an object sensed by one of the sensors within the sensor suite 130 may be on a distant horizon as viewed from the autonomous aircraft 120. To process the horizon object for a human display, the processor must rely on perspective transformation to make the distant object view normally for the human eye. This perspective transformation may require a compression of data causing a significant loss in fidelity and ultimately, an object that is unusable to the manned aircraft. Here, without a perspective transformation, the object ID and positioning system 150 may process the data stream in raw form without perspective transformation or fidelity loss and enable the object ID and positioning system 150 to accurately rely on the distant object for positioning and trajectory control.

FIG. 2 Data

Figure 2:
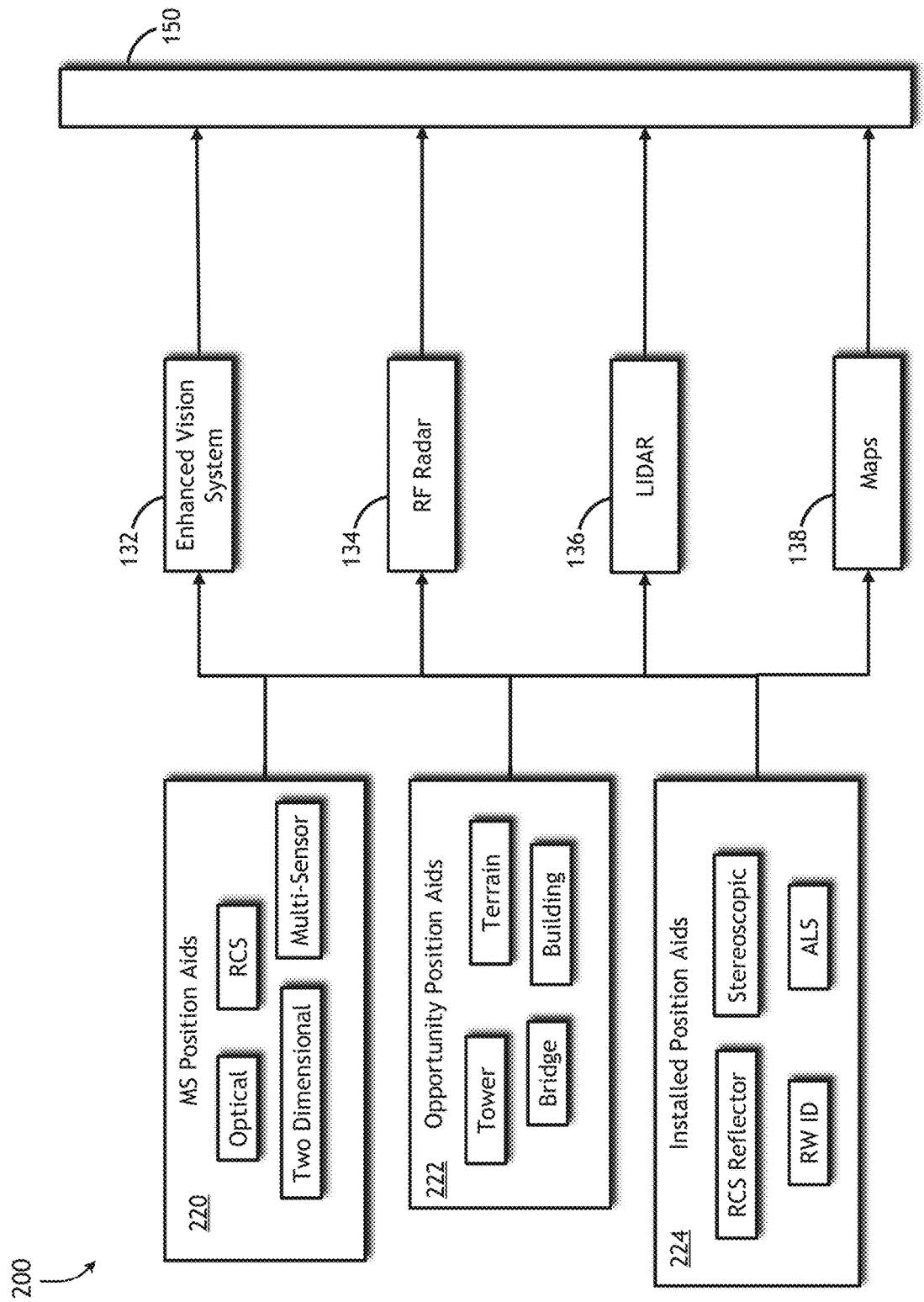
FIG. 2 is a diagram of sensor data usable by an embodiment of the inventive concepts disclosed herein.

Referring now to FIG. 2, a diagram of sensor data usable by an embodiment of the inventive concepts disclosed herein is shown. A diagram of sensor data details 200 may indicate a plurality of position aids usable by the object ID and positioning system 150 in determining the precise position.

In embodiments, a position aid definition may include those objects able to be sensed by one or more of the sensors onboard the autonomous aircraft 120 and having some quality usable by the object ID and positioning system 150 to update and verify a position. A position aid may define a location by name as well as function as a checkpoint along a route enabling object ID and positioning system 150 to update as well as verify a current position solution. Similar to a runway ID (e.g., 24) or an enroute navigation aid (e.g., VOR, TACAN), position aids may enable the object ID and positioning system 150 to accurately navigate the autonomous aircraft 120 from departure to a desired destination solely reliant upon sensor data received via the sensor suite 130.

MS position aids 220 may include objects usable by the object ID and positioning system 150 to sense and therefore, use to determine the position of the autonomous aircraft 120. For example, optical position aids may include those objects of particular sensitivity to one of the enhanced SVS 132 sensors. White numbers or stripes painted on a runway, a red roof, a white concrete pier surrounded by dark water may be examples of optical object of particular interest to one of the enhanced SVS 132 sensors.

RCS position aids may include those objects maintaining an RCS specifically tuned to the RF RADAR 134 or simply an RCS of a sufficient magnitude to be imaged by any RADAR system. Here, an object placed at an end of a runway or along an approach path may be examples of RCS position aids. Two-dimensional position aids able to be imaged by a LIDAR system 136 may include terrain objects and objects which possess a significant change in altitude. Cliffs next to a body of water and canyons next to a plain may be examples of two-dimensional MS position aids.

Multi sensor position aids 220 may include those objects able to be sensed by diverse sensors. For example, a hot smoke stack may be sensed by an IR sensor within the enhanced SVS 132 as well as by the RF RADAR system 134 and the LIDAR 136. These multi-sensory objects may be of particular interest since weather changes may inhibit one or more sensors from imaging an object while the other sensors may "see through" the weather condition.

Opportunity position aids 222 may include those targets of opportunity which may be useable by the object ID and positioning system 150 and previously surveyed. Attributes of the opportunity position aids 222 may be stored within the MS database 174 for use by the autonomous aircraft 120 or other autonomous aircraft following later.

For example, a radio tower, water tower, terrain features, a bridge or building corner may be specifically interesting to one or more sensors within the sensor suite 130. As the autonomous aircraft 120 may fly within range of these opportunity position aids 222, the sensor suite 130 may sense and send attributes of the sensed objects to the object ID and positioning system 150 for catalog and storage within the MS database 174 for later use.

Installed position aids 224 may function as markers for the object ID and positioning system 150 to determine the autonomous aircraft 120 position relative to the installed position aids 224. Here, certain objects may be specifically configured for increased visibility to one or more of the sensors within the sensor suite 130. Multispectral position and navigation aids for autonomous operations may be specifically tuned to one of the sensors. For example, a high radar cross section object may be specifically tuned to a frequency and wavelength of the onboard RF RADAR 134 sensor. Unlike navigational aids of today (e.g. ILS, VOR, ALS), these tuned objects may be placed anywhere along the anticipated autonomous aircraft 120 path and easily visible to one or more of the sensors within the sensor suite 130.

The tuned objects may be sited in strategic locations and configured in constellations easily recognized by the sensor suite 130. The object ID and positioning system 150 may recognize the exact relative placement of the constellation with great accuracy and enable a verification of the accuracy of the position solution. Further, constellations or patterns of the installed position aids may be unique unmistakable patterns easily analyzed quantitatively and therefore recognizable by the object ID and positioning system 150.

FIG. 3 Logic Flow

Figure 3:
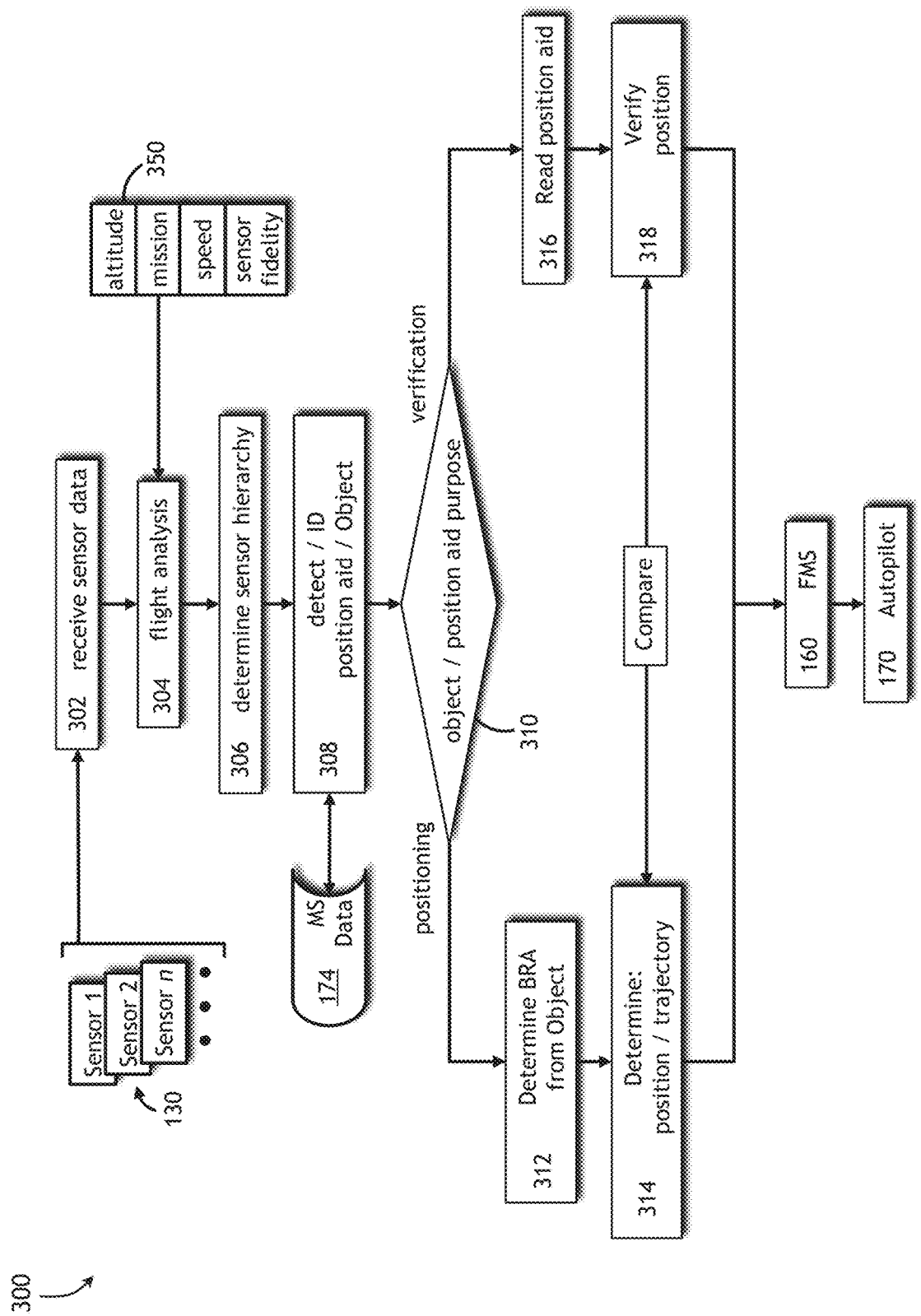
FIG. 3 is a logic flowchart of an exemplary embodiment of the inventive concepts disclosed herein.

Referring now to FIG. 3, a logic flowchart of an exemplary embodiment of the inventive concepts disclosed herein is shown. MS system logic flow 300 may indicate one exemplary logic flow of the object ID and positioning system 150. A step 302 may include receiving sensor data from one or more sensors from the sensor suite 130. As above, the sensor data may include one or more attributes of the sensed object. A step 304 may include a flight analysis based on the plurality of factors including altitude, mission, speed and sensor fidelity, etc. The object ID and positioning system 150 may use the flight analysis 304 for follow on action such as, step 306, the object ID and positioning system 150 may determine a sensor hierarchy to align the sensors in one or more orders of hierarchy from which to proceed with sensor data analysis.

In one embodiment of the inventive concepts disclosed herein, the object ID and positioning system 150 may employ a hierarchy of data sets from which to fuse to determine the most accurate precise position for the specific phase of flight. The above example with the autonomous aircraft 120 at FL450 may illustrate the GPS being an accurate sensor from which the object ID and positioning system 150 may derive the precise position at higher altitudes. At lower altitudes, the object ID and positioning system 150 may alter the hierarchy of sensor data sets. For example, at 5,000 ft AGL, the RF RADAR system 134 may offer accurate positioning data fused with GPS data to the object identification and positioning system 150. At 1,000 ft AGL, the enhanced SVS 132 fused with the RA may offer a most accurate set of data to the object identification and positioning system 150.

In one embodiment of the inventive concepts disclosed herein, the object ID and positioning system 150 may determine the sensor hierarchy based on the flight analysis of a plurality of factors. An altitude as discussed above may be one factor while a mission may be another. For example, one mission profile may be a low altitude point to point navigation to deliver a package. In this low altitude situation, one sensor hierarchy may include the RA and LIDAR system 136 near the top of the sensor hierarchy.

Autonomous aircraft 120 speed may be another element for flight analysis to determine the sensor hierarchy. At high speeds, the GPS may be a most accurate sensor while at lower speeds the RF RADAR system 134 may be the most accurate. Sensor fidelity may offer another factor to which the object ID and positioning system 150 may reference for establishing the sensor hierarchy. Should the object ID and positioning system 150 determine that a sensor becomes unreliable due to that sensor producing data outside of a normalized position as determined by an analysis of data received by the remaining sensors within the sensor suite 130, the object ID and positioning system 150 may place that unreliable or inaccurate sensor lower on the sensor hierarchy.

The below table may illustrate one exemplary altitude-based and flight analysis-based hierarchy of sensor ranked by the object identification and positioning system 150:

| Altitude AGL | Phase of Flight | Sensor Hierarchy |
| --- | --- | --- |
| >10,000 | Cruise | GPS |
|  |  | IRS |
|  |  | Maps |
| 5,000 | Cruise/Descent | GPS |
|  |  | RF RADAR |
| 2,000 | Approach | LIDAR |
|  |  | RF RADAR |
|  |  | GPS |
| 500 | Short Final | VS |
|  |  | RA |
|  |  | GPS |
|  |  | ILS |
| 50 | Landing | VS |
|  |  | RA |
|  |  | ILS |

Here, one sensor hierarchy may be altitude based while another may be mission, speed, and/or sensor fidelity based. Regardless of the basis for hierarchy, the object ID and positioning system 150 may identify which sensor may be the most accurate as well as which sensors are worthy of analysis. For example, at FL450, the RA may be nearly useless as range to the surface may be too distant for the RA to receive useable data.

The object ID and positioning system 150 may also use autonomous aircraft 120 configuration 244 and status 246 to aid in determining the sensor hierarchy. For example, should the autonomous aircraft 120 have the landing gear down with the RA reporting 200 ft AGL, the object ID and positioning system 150 may determine the autonomous aircraft 120 is ready for landing and appropriately order the sensor hierarchy and therefore, the received sensor data for analysis.

A step 308 may include detection an identification of the sensed object. Based on a comparison of the at least one attribute of the sensed object with historical data within MS database 174, the object ID and positioning system 150 may identify the sensed object.

A step 310 may include a query of whether the purpose of the sensed object/position aid is for positioning or position verification. For positioning, the object ID and positioning system 150 may determine, at a step 312, the BRA from the sensed object to the autonomous aircraft 120 and, at a step 314, determine the position and trajectory of the autonomous aircraft 120 based on the BRA information.

Should the query of step 310 indicate the purpose of the sensed object is for position verification, the logic may flow to a step 316 with reading and interpreting the sensed object/position aid and, at a step 318 the object ID and positioning system 150 may verify the position of the autonomous aircraft 120 based on the information read in the position aid compared with the determined position at step 314.

The step 314 may determine both the trajectory and vertical speed of the autonomous aircraft 120. Here, a 3-D vector of the autonomous aircraft 120 relative to the datum may function as each of the trajectory and vertical speed. The object ID and positioning system 150 may then command each of the FMS 160 and autopilot 170 for actuation of the flight controls 122.

FIG. 4 Method Flow

Figure 4:
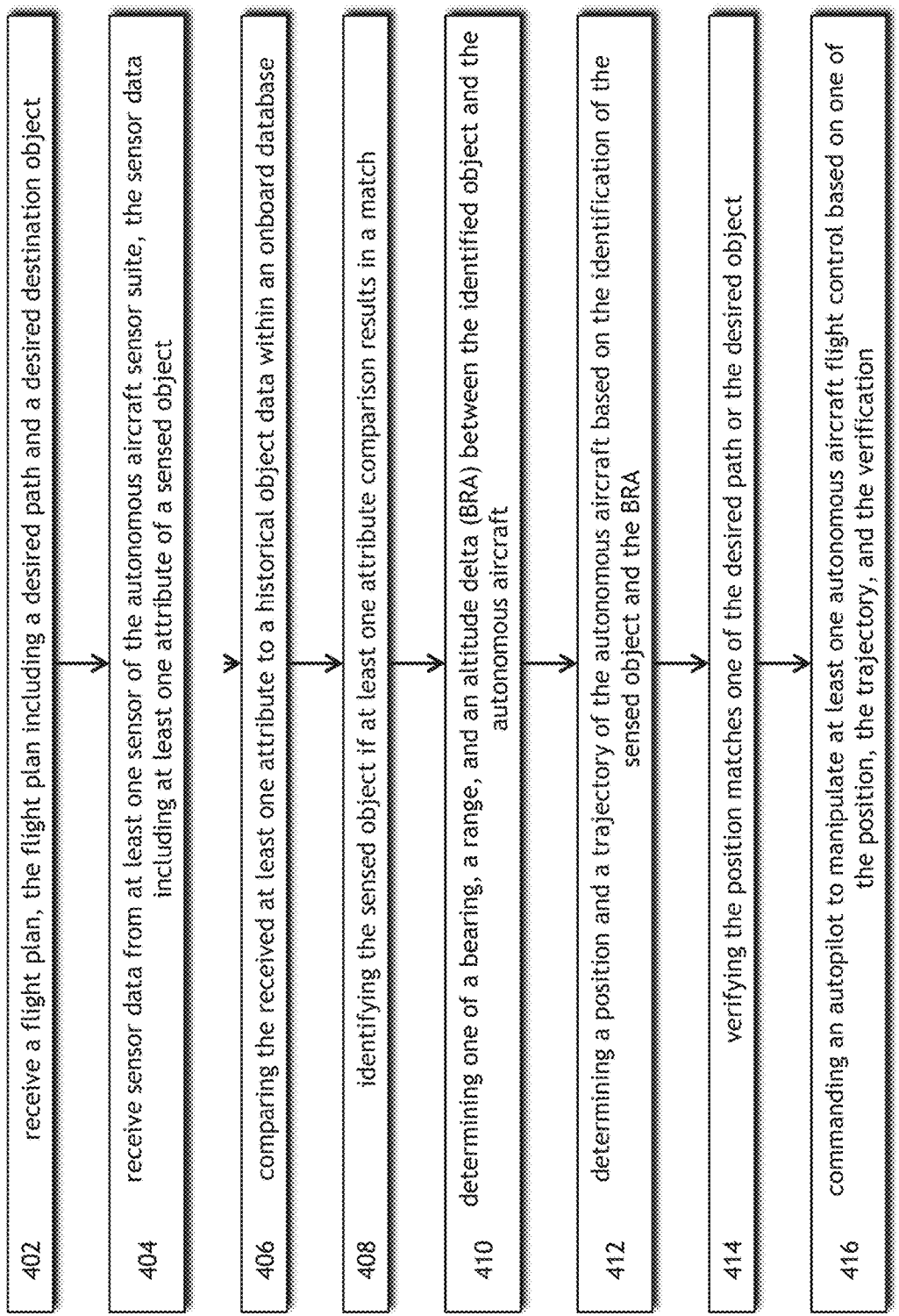
FIG. 4 is a diagram of method steps exemplary of one embodiment of the inventive concepts disclosed herein.

Referring now to FIG. 4, a diagram of method steps exemplary of one embodiment of the inventive concepts disclosed herein is shown. MS enhanced database method flow 400 may include exemplary steps for a method for MS object identification. A step 402 may include receiving a flight plan, the flight plan including a desired path and a desired destination object. As above, the desired destination object may normally be a landing airfield but may also include a land or sea-based landing surface. A step 404 may include receiving sensor data from at least one sensor of an autonomous aircraft sensor suite, the sensor data including at least one attribute of a sensed object.

A step 406 may include comparing the received at least one attribute to historical object data within the MS database 174 and a step 408 may include identifying the sensed object if the at least one attribute comparison results in a match.

A step 410 may include determining one of a bearing, a range, and an altitude delta (BRA) between the identified object and the autonomous aircraft and a step 412 may include determining a position and a trajectory of the autonomous aircraft based on the identification of the sensed object and the BRA. In embodiments, the object ID and positioning system 150 may determine a position and trajectory of the autonomous aircraft 120 relative to the sensed object and a position and trajectory relative to the datum. In this manner, the object ID and positioning system 150 may determine the autonomous aircraft 120 position relative to the sensed object regardless what the sensed object is (e.g., a runway, an aircraft, an oil rig). The object ID and positioning system 150 may function to fly the autonomous aircraft 120 relative to the runway and command the autonomous aircraft 120 to land as well as maintain a relative position in formation with another aircraft and maneuver the autonomous aircraft 120 relative to the other aircraft.

A step 414 may include verifying the position matches one of the desired path or the desired destination object while a step 416 may include commanding an autopilot to manipulate at least one autonomous aircraft flight control based on one of the position, the trajectory, and the verification. Here, the object ID and positioning system 150 may use the sensed position aid as well as a plurality of sensed objects to verify the position of the autonomous aircraft 120.

In one embodiment of the inventive concepts disclosed herein, the object ID and positioning system 150 may function to verify the position matches the desired path or the desired object via a verification of position based on one of an object attribute received via second sensor data, an object attribute descriptive of a position of the object, and an object attribute representative of an appearance of the object to a sensor in a specific electromagnetic frequency band. In this manner, the object ID and positioning system 150 may receive the data associated with the position (e.g., runway ID) aid and verify the position of the autonomous aircraft 120 via the information inherent within the position aid.

Figure 5:
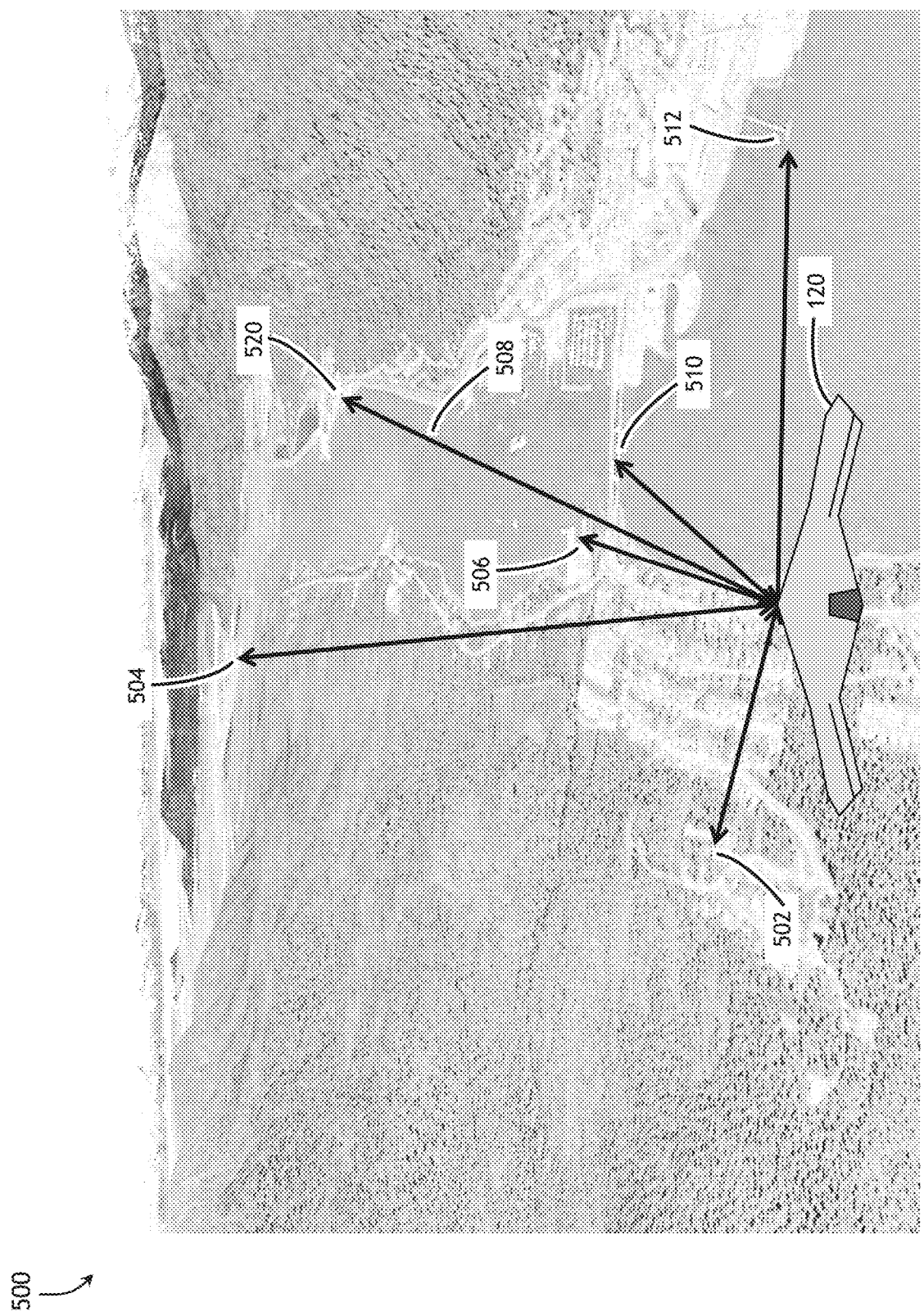
FIG. 5 is a diagram of an arrival view in accordance with one embodiment of the inventive concepts disclosed herein.

FIG. 5 Arrival View

Referring now to FIG. 5, a diagram of an arrival view in accordance with one embodiment of the inventive concepts disclosed herein is shown. An arrival view 500 may portray objects available to the sensor suite 130 for use by the object ID and positioning system 150 in positioning determination of the autonomous aircraft 120. Here, a plurality of objects within view of the sensors may include a combination of MS position aids 220 and opportunity position aids 222 including optically significant objects, RADAR significant objects, and LIDAR significant objects. A sensor line of sight (LOS) 508 may indicate an area of interest for one or more of the sensors. Of note, each sensor may maintain a FOV much greater than a current sensor LOS. Contemplated herein, a sensor FOV may be a 360-degree spherical coverage around the autonomous aircraft 120 with antenna elements mounted in a variety of positions on the autonomous aircraft 120.

Sensor LOS 508 may enable one or more of the sensors to image sensor significant ground objects such as a neighborhood 502 as well as a Juneau PAJN RW26 threshold 504. A marina 506 may offer a warm weather object however, a bridge center 510, a salmon hatchery 520, and a pier-T 512 may be sensed year-round.

Of note, many objects may not be mutually exclusive to a single sensor within the sensor suite 122. For example, a visually significant object may also be LIDAR significant while a RADAR significant object may also be an identifiable map object. Each of the sensors within the sensor suite 122 may operate individually to sense each of the significant objects within view to provide sensor data to the object ID and positioning system 150.

Figure 6:
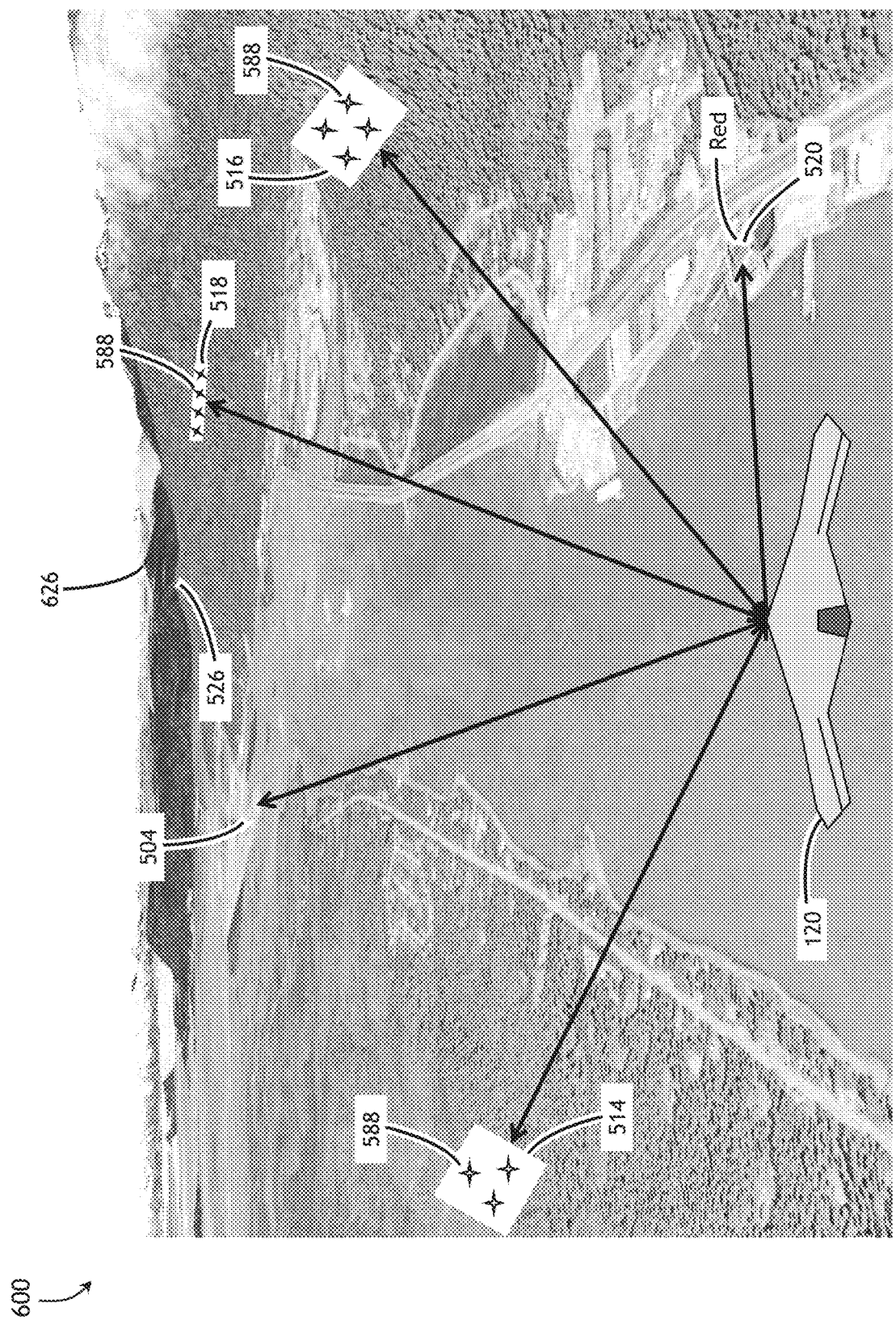
FIG. 6 is a diagram of an approach view of an exemplary embodiment of the inventive concepts disclosed herein.

FIG. 6 PAJN Approach View

Referring now to FIG. 6, a diagram of an approach view of an exemplary embodiment of the inventive concepts disclosed herein is shown. PAJN Approach view 600 may indicate each object available to the sensor suite 130 for identification and precise positioning of the autonomous aircraft 120.

Here, a plurality of MS position aids 220, opportunity position aids 222, and installed position aids 224 may be indicated. Similar to a "digital approach plate", each position aid may offer the object ID and positioning system 150 an object usable as a position aid when flying a path. One example of an installed position aid 224 may include a position and navigation aid constellation of sensor significant objects 588 available to one or more sensors for imaging and use by the object ID and positioning system 150. Enroute to PAJN, the autonomous aircraft 120 may image a left 10-mile marker 514 made up of three sensor significant objects 588 as well as a right 10-mile marker 516 made up of four sensor significant objects 588.

Contemplated herein, the installed position aids 224 may be mounted on the surface or, similar to an ALS, mounted above the surface for greater visibility to the sensor suite 130. In one exemplary embodiment, the installed position aids may be mounted on top of a post approximately 20 ft from the ground. In this manner, snow or vegetation growth may not impede a sensor LOS to the installed position aid 224.

Of note, one or more of the sensors within sensor suite 130 may be able to image a position aid such as the right 10-mile marker 516 at a range beyond visual to a human pilot. In this manner, the object ID and positioning system 150 may employ each sensor to image an object at a range limited only by the sensor capabilities.

Additional sensor significant objects on approach to PAJN may include PAJN RW26 504, Juneau Hill 526 aligned with Tongass Mountain 626, a right 5-mile marker 518, and the salmon hatchery 520 with a red colored roof. Here, the salmon hatchery 520 may be an example of an opportunity position aid 222 having attributes sensible by more than one sensor within the sensor suite 130. An optical sensor may image the red color of the roof while a LIDAR sensor may image the shape of the building and the RF RADAR sensor may image the vertical corners of the building. The object ID and positioning system 150 may use each of these attributes to detect and identify the sensed building and accurately determine the autonomous aircraft 120 position based on a triangulation of BRA data as well as a synthesis of sensor data from the plurality of sensors.

FIG. 7 Multiple Aspect Views

Referring now to FIGS. 7A-7D, a series of diagrams of aspect views 700 associated with one embodiment of the inventive concepts disclosed herein is shown. The four exemplary aspects FIG. 7A-7D may indicate a view from the autonomous aircraft 120 as it passes the object (red roof salmon hatchery 520) on an approach to PAJN RW26 504. Similar to what a pilot may do, the object ID and positioning system 150 may determine the position and trajectory of the autonomous aircraft 120 based on the aspect from the known object 520.

Figure 7A:
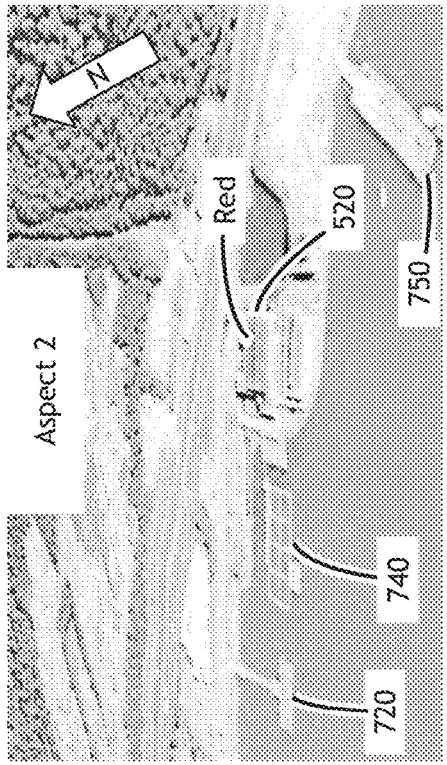
FIG. 7A-7D are diagrams of a series of aspect views associated with one embodiment of the inventive concepts disclosed herein.
Figure 7B:
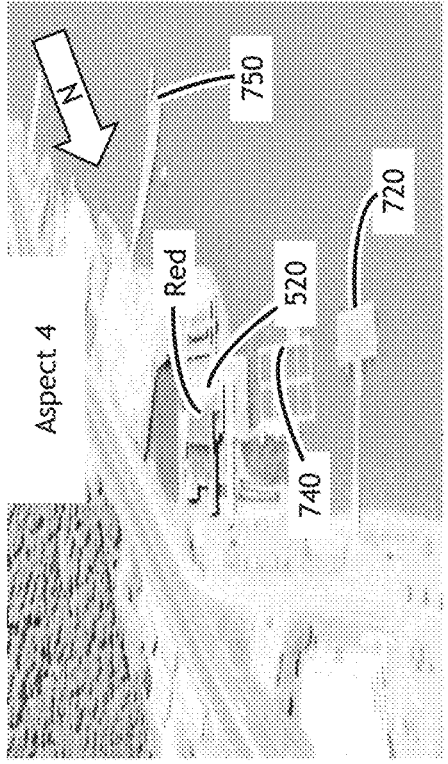
Figure 7C:
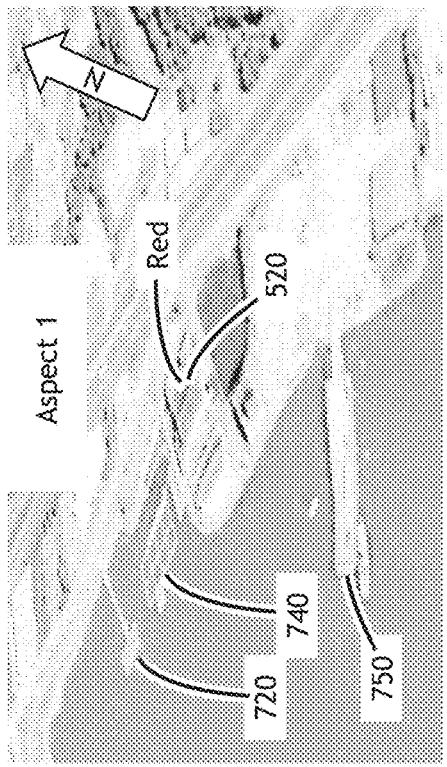
Figure 7D:
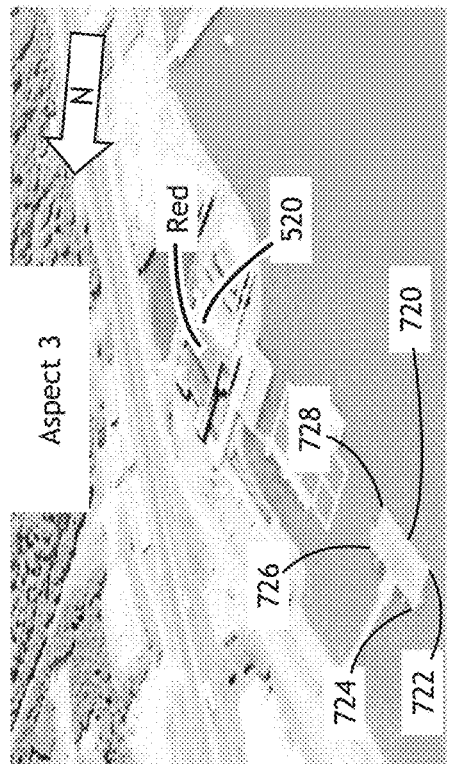

As the autonomous aircraft 120 approaches building 520 from the south, the sensor suite 130 may image a boat dock 720, hatchery ponds 740, and a long pier 750. As the autonomous aircraft 120 maintains a heading of approximately 280 degrees magnetic, the aspect of the salmon hatchery 520 may change. FIG. 7B indicates a view of a southwest face of the salmon hatchery 520. FIG. 7C indicates a northwest face of the salmon hatchery 520, and FIG. 7D may indicate a 90-degree relative view of the northwest face of the salmon hatchery 520.

Referring back to FIG. 7C, each corner of the boat dock 720 may be sensed by one or more of the sensors as the autonomous aircraft 120 passes. A boat dock corner west 722, a boat dock corner northwest 724, a boat dock corner northeast 726, and a boat dock corner southeast 728 may each aid the object ID and positioning system 150 in positioning of the autonomous aircraft 120. The object ID and positioning system 150 may receive the attributes of each corner and based on the alignment of each corner relative to the other corners over time, the object ID and positioning system 150 may determine the position and trajectory of the autonomous aircraft 120.

In embodiments, the object ID and positioning system 150 may store multiple views of the objects within the MS database 174 to make decisions based on the stored views as compared to the received sensor data.

Figure 8:
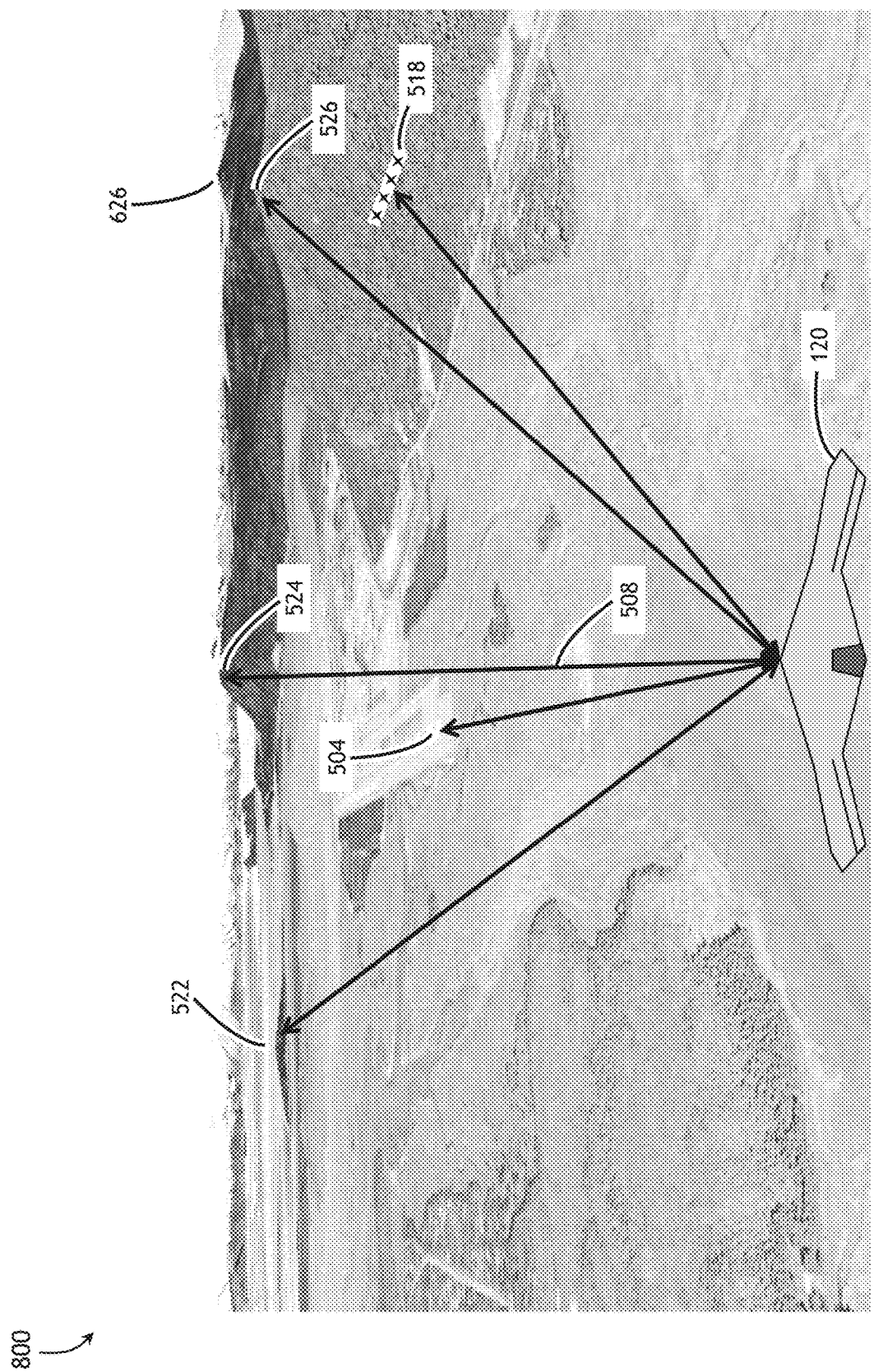
FIG. 8 is a diagram of a final approach view exemplary of one embodiment of the inventive concepts disclosed herein.

FIG. 8 Final Approach PAJN

Referring now to FIG. 8, a diagram of a final approach view exemplary of one embodiment of the inventive concepts disclosed herein is shown. A final approach view 800 may offer the object ID and positioning system 150 a sensor LOS 508 of Coghlan island 522, Auke hill 524, and Juneau hill 526 approximately aligned with Tongass Mountain 626. The right 5-mile marker 518 may indicate to the object ID and positioning system 150 that the autonomous aircraft 120 is approximately 5 miles from touchdown. As the autonomous aircraft 120 proceeds closer to PAJN RW26 504, each of these sensed objects may aid the object ID and positioning system 150 in maintaining accurate positioning and trajectory control.

In one embodiment of the inventive concepts disclosed herein, the object identification and positioning system 310 may employ an analysis of motion flow between two or more sensed objects to determine the position and trajectory. Here, an analysis of a motion flow between Juneau Hill 526 (closer) and Tongass Mountain 626 (distant) may aid the object ID and positioning system 150 in bearing, range, and altitude calculations relative to each of the terrain objects 526 626 as well as relative to PAJN RW26 threshold 504.

For example, as the autonomous aircraft 120 proceeds toward PAJN RW26 504, Juneau Hill 526 may appear to have a greater relative motion (e.g., change in relative bearing) than will Tongass Mountain 628 since the range between the two objects is approximately 7 nautical miles. If the two objects were at the same range, the relative motion of the two would be equal. The object ID and positioning system 150 may use this difference in relative motion between two objects to more accurately calculate the position and trajectory of the autonomous aircraft 120.

In one embodiment, the object ID and positioning system 150 may analyze motion flow (structure from motion) using a single visual sensor mounted on the autonomous aircraft 120 detecting features within the image but utilizing information about the motion of the autonomous aircraft 120 over time to provide a 3D representation of the approaching runway environment. This may require a hybrid solution from GPS/IRS to provide accurate information regarding the motion flow over time but may allow the object ID and positioning system 150 to determine position information without prior knowledge of runway dimensions.

FIG. 9 PAJN Final

Figure 9:
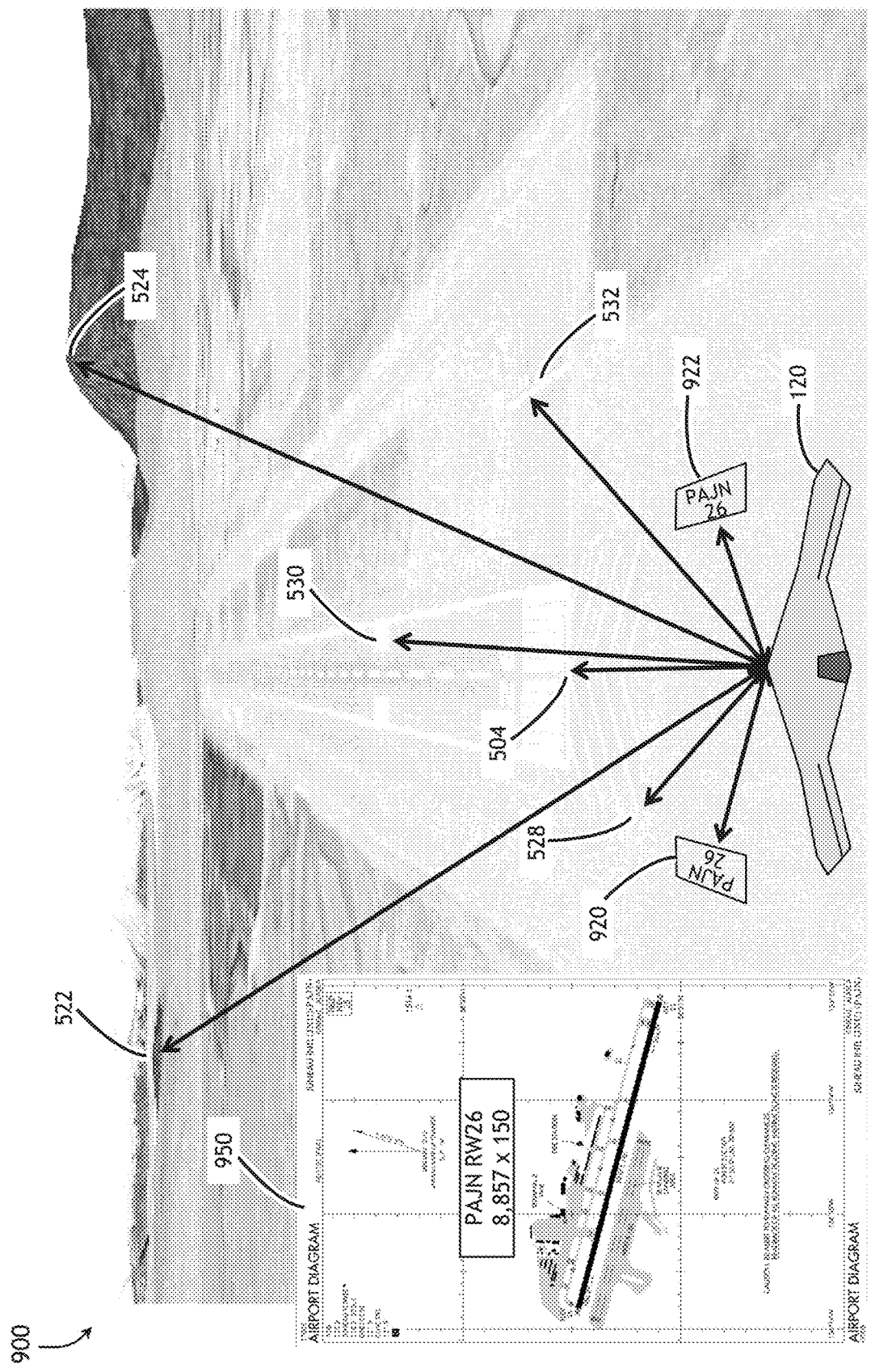
FIG. 9 is a diagram of a short final view exemplary of one embodiment of the inventive concepts disclosed herein.

Referring now to FIG. 9, a diagram of a short final view exemplary of one embodiment of the inventive concepts disclosed herein is shown. The short final view 900 may include runway specific objects as well as distant objects sensed previously. Coghlan island 522 and Juneau hill 526 are still available for the object ID and positioning system 150 to determine a position. On short final, blast pad markings corner 528, aiming point markings 530, and hold short line 532 may be visible to the optical sensor when meteorological conditions may permit.

The object ID and positioning system 150 may function to verify the position of the autonomous aircraft 120 using installed position aids 224 such as an external physical marker tuned to be sensed by one or more sensors to verify the accuracy of the position solution. The installed position aids 224 may inherently possess data which, when interpreted by the object ID and positioning system 150, offer an indication of position. For example, a pattern of RCS objects in a unique formation may communicate to the object ID and positioning system 150 that the autonomous aircraft 120 is a specific position. Here, a left MS runway ident 920 and a right MS runway ident 922 may function to enable the object ID and positioning system 150 to verify the autonomous aircraft 120 is landing on the PAJN RW26 504.

The installed position aids 224 may maintain this inherent data as letters, a code readable by the object ID and positioning system 150, IR reflective paint, or another more subtle indicator of position. Similar to letters on the roof of a building, the physical marker may communicate information to the autonomous aircraft 120 to verify position accuracy.

Also, the object ID and positioning system 150 may interpret each of the existing objects around the airfield in combination to ensure position verification. Here, a unique combination of a constellation including Coughlan Island 522, Auke Mountain 524, and the marker PAJN 26 920 may indicate to the autonomous aircraft 120 that there is no other airfield in the world that maintains this constellation of related objects.

In embodiments, the position verification may include comparing a second sensor data stream received via a second sensor as well as reading a position aid data attribute via the second sensor. A PAJN airfield diagram 950 may be formatted for a human pilot. Here, the data included within the airfield diagram 950 may be stored as historical attributes of, for example, RW26 having a length of 8,857 ft and a width of 150 ft. These historical attributes may aid the object ID and positioning system 150 in landing on the desired destination object (here PAJN RW26). However, there are areas which include similar runways with similar features appealing to human pilots to land on a field other than the intended runway. The object ID and positioning system 150 operates to compensate for this appeal using a data-based approach to positioning.

FIG. 10 KRAP Final

Figure 10:
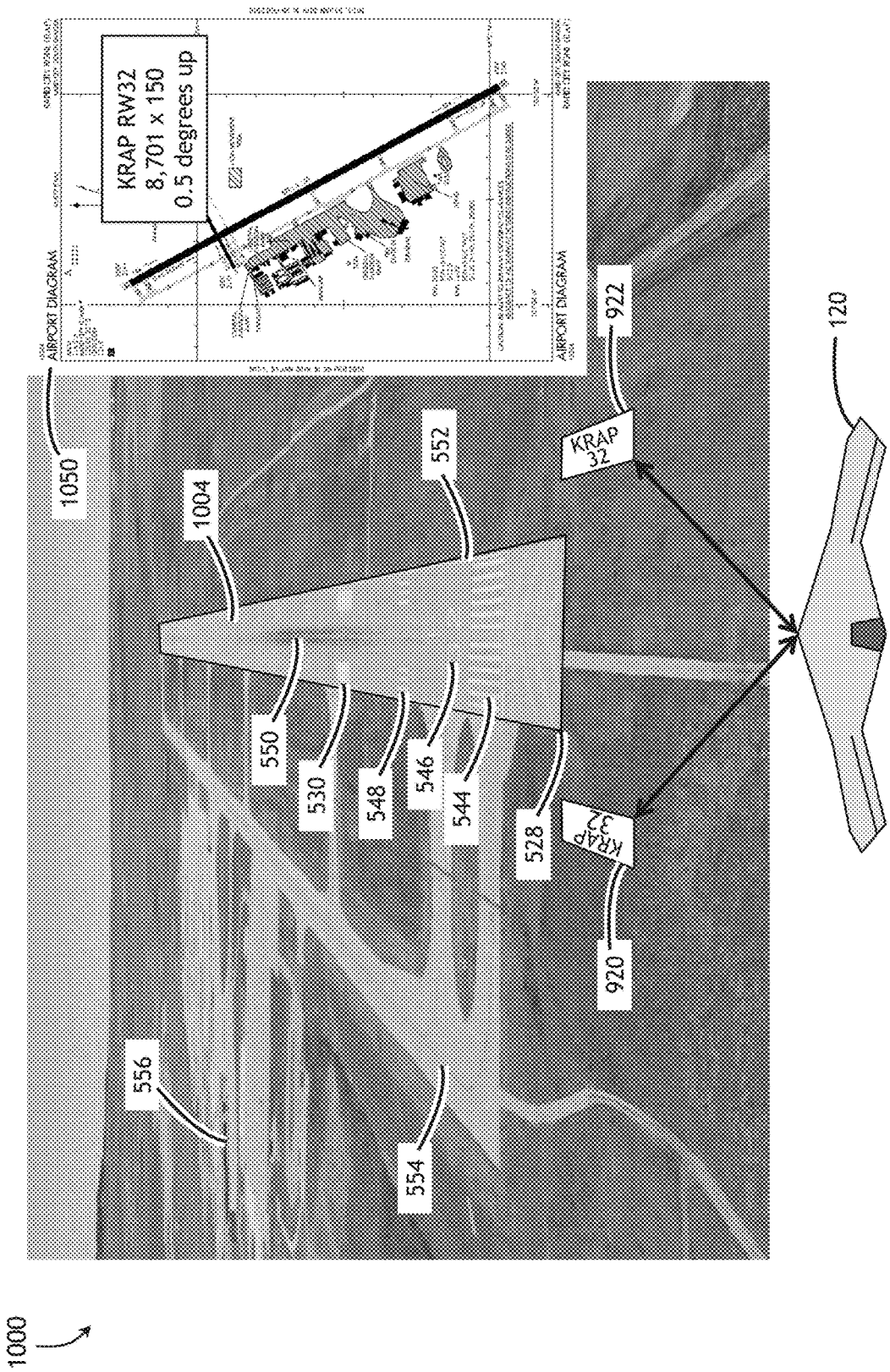
FIG. 10 is a diagram of a short final view associated with one embodiment of the inventive concepts disclosed herein.

Referring now to FIG. 10, a diagram of a short final view associated with one embodiment of the inventive concepts disclosed herein is shown. A KRAP short final view 1000 may indicate a runway of similar features to a nearby field. The object ID and positioning system 150 may use MS sensors to image each object along the flight path to ensure the autonomous aircraft 120 is correctly following the assigned flight path and landing at the assigned destination object. Here, the assigned flight path may include a landing on KRAP RW 32 1004 and use each MS sensor from the sensor suite 130 to not only determine the position of the autonomous aircraft 120 but also verify the position of the autonomous aircraft 120 using diverse sensors. Here, the enhanced SVS 132 sensor may image a runway designation number 546 while the RF RADAR sensor 134 may image the left and right MS runway identifier 920 922.

The object ID and positioning system 150 may perform a principal component analysis of the area surrounding an assigned runway to verify the autonomous aircraft 120 is following the assigned path. Each sensor may aid the object ID and positioning system 150 in verification of the correct path by imaging objects surrounding the path which may distinguish the area from similarly looking areas (e.g., a rectangular slab of concrete). For example, at KRAP, KRAP taxiway A 554 is on the left, the KRAP terminal 556 is further left, and there are seven exits between KRAP RW32 1004 and taxiway A 554. The optical sensor may image threshold markings 544, the RW designation number 546, the touchdown zone (TDZ) markings 548, runway centerline 550 as well as edge markings 552. In this manner, the object ID and positioning system 150 may verify the autonomous aircraft 120 is following the desired path and landing on the correct runway.

In one embodiment of the inventive concepts disclosed herein, the object ID and positioning system 150 may detect each object within a sensor FOV around the autonomous aircraft 120 path. Here, a vision-based feature detection of runway and airport environment components (e.g., runway, ALS, etc.). The object ID and positioning system 150 may use edge detection and fitting lines to runway features (e.g., edges, threshold, taxiways, etc.) then deriving position from that information via an inverse perspective projection. With reference to the MS database 174 which includes each detail of the intended runway (e.g., length, width, slope available from KRAP airport diagram data 1050), the object ID and positioning system 150 may compare attributes of the historical object data to the newly sensed data to determine a position solution and land the autonomous aircraft 120 on the correct runway.

FIG. 11 KRCA Final

Figure 11:
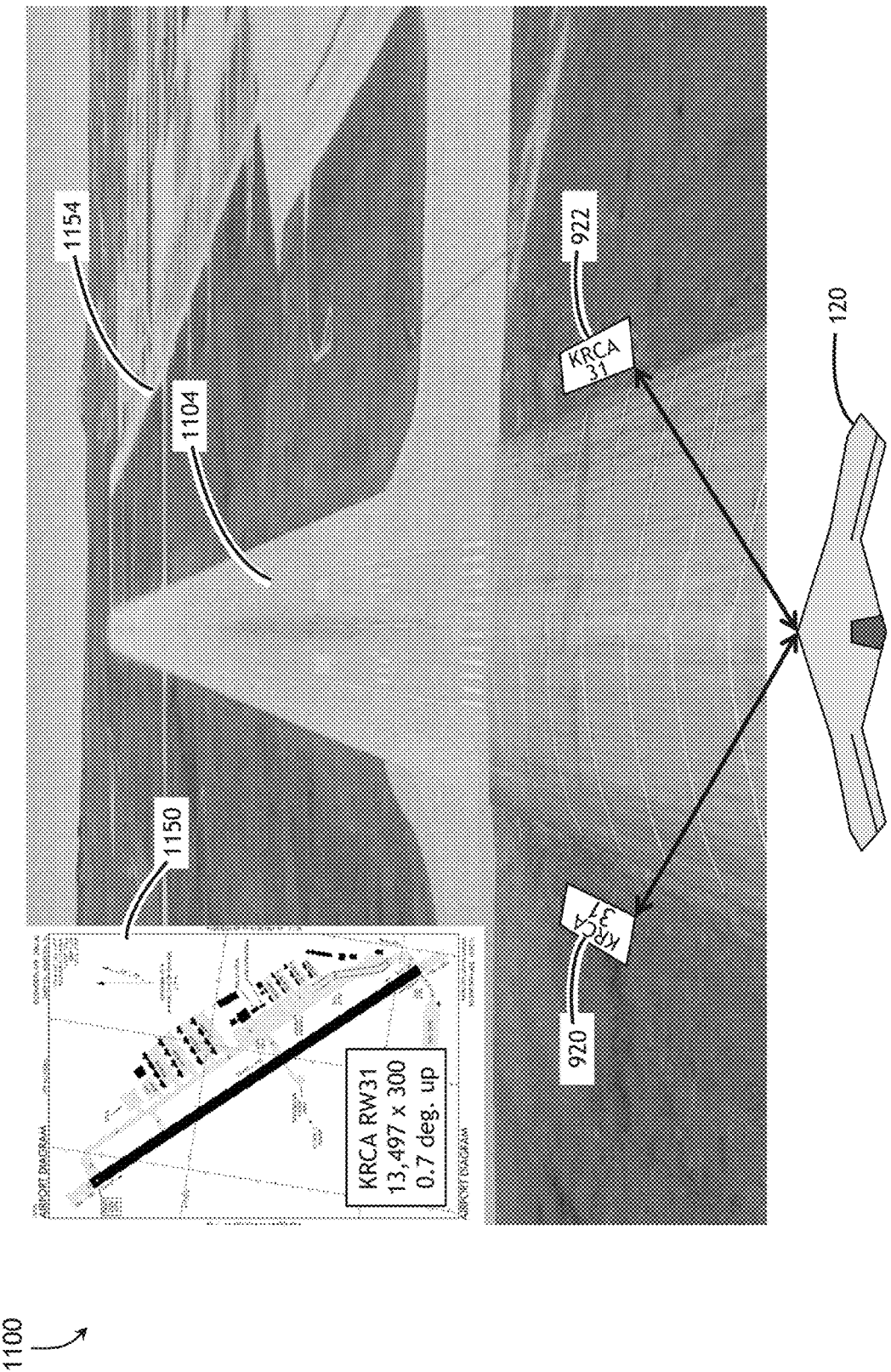
FIG. 11 is a diagram of short final view associated with one embodiment of the inventive concepts disclosed herein.

Referring now to FIG. 11, a diagram of short final view associated with one embodiment of the inventive concepts disclosed herein is shown. A short final view of KRCA 1100 may indicate a runway of similar characteristics and attributes to KRAP RW32 1004. KRCA RW31 1104 may be similar in location and direction but maintain significant differences in attributes which the object ID and positioning system 150 may easily distinguish. The KRCA airport diagram 1150 may indicate data stored within MS database 174 including a length of 13,497 ft and a width of 300 ft. At the same AGL altitude, each runway may appear similar but the 300 ft width of KRCA RW31 1104 may be one telling difference available to the object ID and positioning system 150 to verify the proper position.

Moreover, the left and right MS Runway Ident 920 922 may indicate to the object ID and positioning system 150 that the autonomous aircraft 120 is indeed landing on KRCA RW31 1104. As above, the constellation of objects around KRCA RW31 including KRCA taxiway A 1154 on the right may aid the object ID and positioning system 150 in determining accurate destination object.

FIG. 12 ALSF-2

Figure 12:
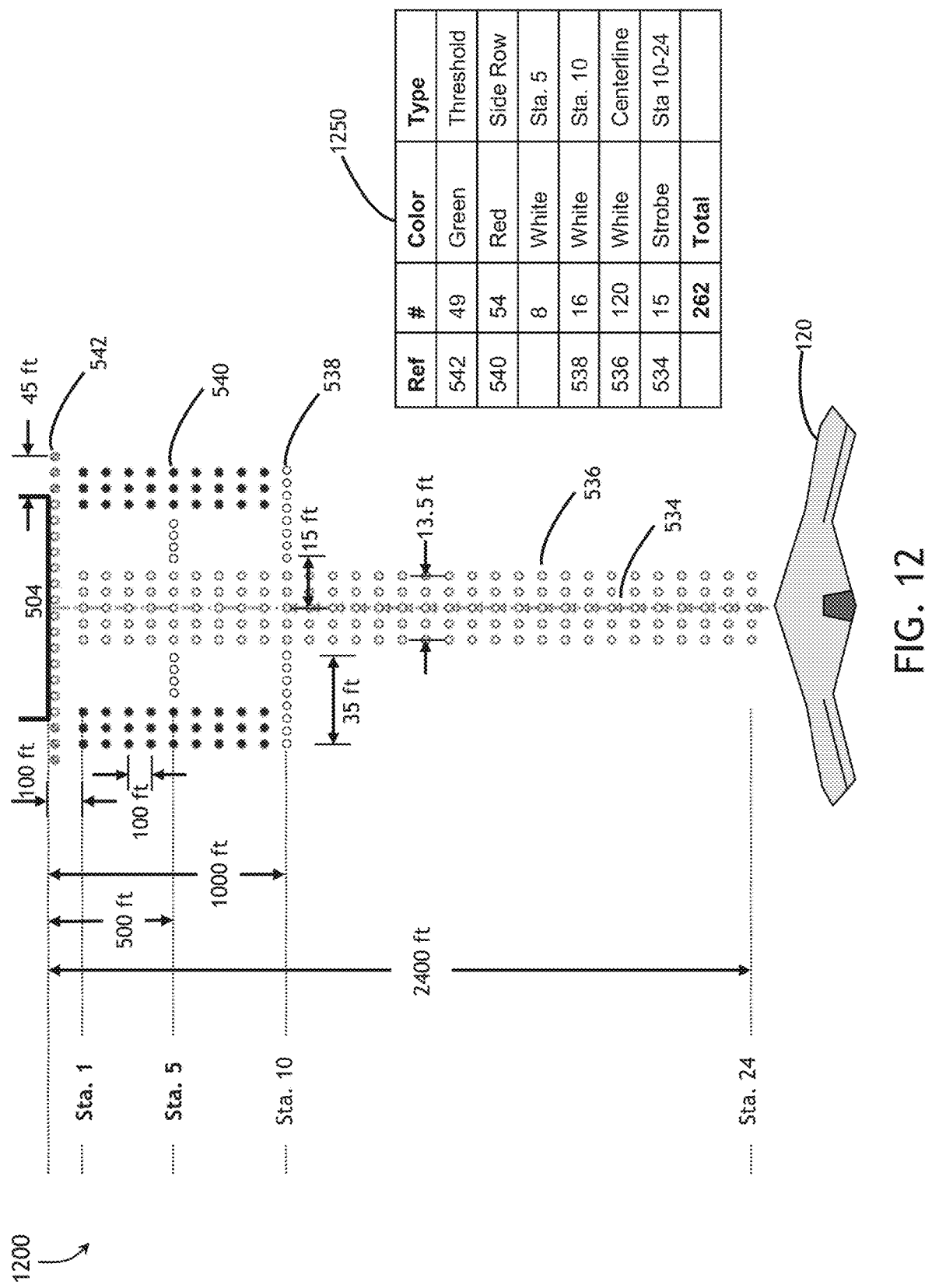
FIG. 12 is a diagram of an approach lights system associated with one embodiment of the inventive concepts disclosed herein.

Referring now to FIG. 12, a diagram of an approach lights system associated with one embodiment of the inventive concepts disclosed herein is shown. Here, an exemplary diagram of an approach lights system with sequenced flashing lights (ALSF 2) system 1200 with an associated standardized size may be usable by the object ID and positioning system 150 as one object from which to extract positioning information.

For example, the object ID and positioning system 150 may command one or more of the sensors within the sensor suite 130 to detect, identify, and track a pattern of approach lights associated with a landing runway. In this manner, the object ID and positioning system 150 may, based on positioning and trajectory determinations derived from BRA measurements from the constellation of ALS, command the autopilot to accurately fly the autonomous aircraft 120 relative to the approach lights (and thus, the runway).

Optical sensors within the sensor suite 130 may image an individual light within the approach lights 1200 during both day and night operations. ALSF-2 table 1250 may indicate each light associated with the ALSF-2 1200. Since the lights maintain a colored cover, the object ID and positioning system 150 may discern a green cover from a red or white cover during day as well as night. White lights may include sequenced flashing white 534, centerline bars white 536, a 1000 ft bar white 538 while red may include a side row bar red 540. Approaching the runway, threshold green 542 lights may indicate the beginning of prepared surface.

As each runway maintains an individual but standardized ALS for each runway, the MS database 174 may maintain each dimension of the ALS installed for the intended runway. Some runways may have a limited constellation of ALS while other runways maintain the full ALSF 2 systems. Here, the ALSF 2 system maintains row of 120 white centerline bars 536 with a dimension of 2400 ft in length and 13.5 ft in width. Each row maintains 5 lights and rows are 100 ft apart. Specifically interesting to the RF RADAR 134, the white centerline bars may offer a standard size object leading to each runway. The object ID and positioning system 150 may use this data as a priori information to determine a position of the autonomous aircraft 120 based on aspect analysis of the known size of the ALS.

Figure 13:
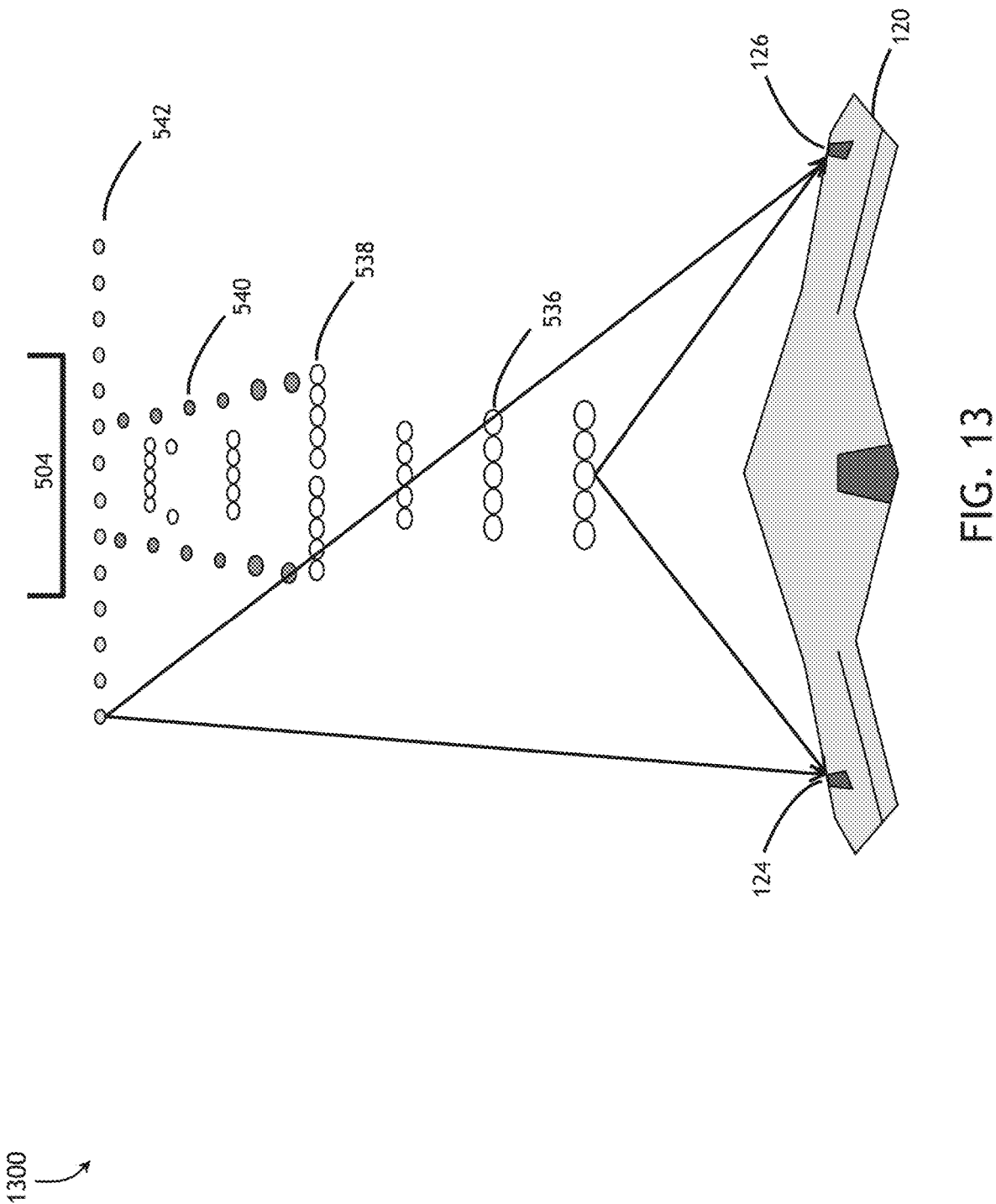
FIG. 13 is a diagram of a stereoscopic view of one embodiment of the inventive concepts disclosed herein.

FIG. 13 Stereoscopic

Referring now to FIG. 13, a diagram of a stereoscopic view of one embodiment of the inventive concepts disclosed herein is shown. A stereoscopic view 1300 may indicate multiple optical sensors including a port stereoscopic camera 124 and a starboard stereoscopic camera 126 available to the object ID and positioning system 150 for stereoscopic imaging of objects. Such optical sensors 124 126 may be mounted on the autonomous aircraft 120 leading edge with a lateral offset on the wings for greatest parallax. In this manner, the object ID and positioning system 150 may determine range to an object merely by use of multiple laterally offset sensors 124 126.

In the stereoscopic view 1300, each sensor 124 126 may image the same green threshold light 542 and, as green threshold lights 542 must be within 10 ft of the runway threshold, determine a range to the runway threshold based on the range to the green threshold light 542.

Stereoscopic imaging may enable the object ID and positioning system 150 to determine range to runway, AGL altitude, etc. without prior knowledge of runway shape and dynamics.

In one embodiment of the inventive concepts disclosed herein, the object ID and positioning system 150 may employ stereoscopic imaging to identify specific objects. For example, the object ID and positioning system 150 may identify a type of aircraft within range of the stereoscopic optical sensors by a measurement of size, wingspan, and number of engines. In this manner, the object ID and positioning system 150 may employ the stereoscopic optical system to verify a specific destination object should the destination object be an aircraft.

Figure 14:
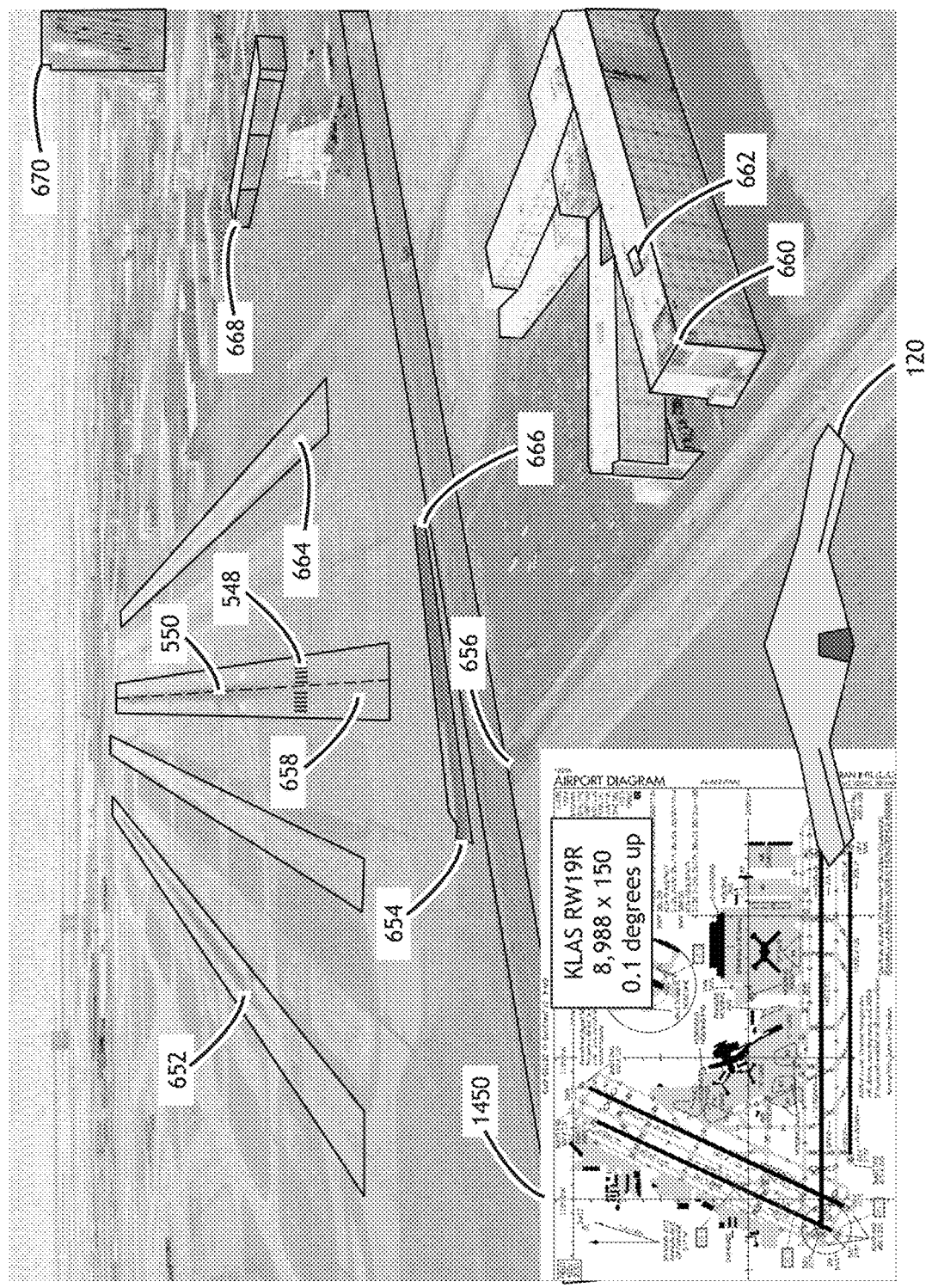
FIG. 14 is a diagram of a short final view in accordance with one embodiment of the inventive concepts disclosed herein.

Of note, the object ID and positioning system 150 including the VS 132 employing optical sensors 124 126 may find function on vehicles other than the autonomous aircraft 120. Contemplated herein, an object ID and positioning system 150 onboard a manned aircraft may function to stereoscopically sense a plurality of objects and therefore, aid a manned position system in accurate positioning, FIG. 14 KLAS Short Final VFR Referring now to FIG. 14, a diagram of a short final view in accordance with one embodiment of the inventive concepts disclosed herein is shown. KLAS short final view 1400 may indicate an additional example of a principal component analysis available to the object ID and positioning system 150 to verify accurate positioning. Here, a KLAS runway diagram 1450 may indicate a general layout of the runways. Here a KLAS RW 19L 652, a blast fence east 654 near a road intersection 656 may offer a perspective of objects available. KLAS RW 19R 658 may be a desired destination object here. A hotel NE corner 660 coupled with a hotel HVAC 662 unit on the roof may indicate objects available to the object ID and positioning system 150. K:AS taxiway H 664, blast fence west 666, hangar south 668, and casino south 670 may make up some principal components available for analysis by the object ID and positioning system 150.

FIG. 15 KLAS IFR

Figure 15:
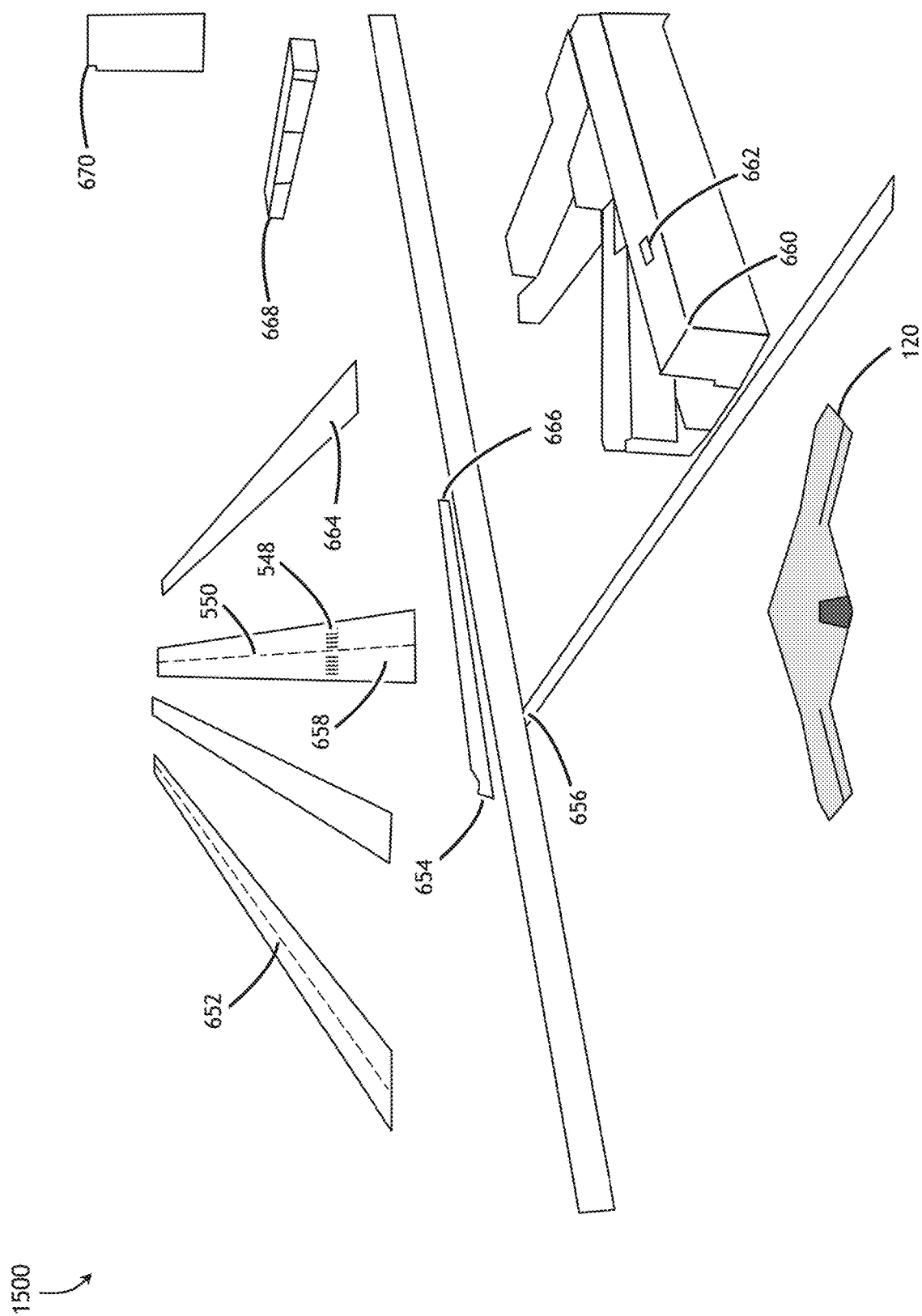
FIG. 15 is a diagram of an IFR short final view associated with one embodiment of the inventive concepts disclosed herein.

Referring now to FIG. 15, a diagram of an IFR short final view associated with one embodiment of the inventive concepts disclosed herein is shown. KLAS IFR view 1500 may indicate a view available to the autonomous aircraft 120 in Instrument conditions. Under instrument flight rules (IFR) or at night, optical sensors may not be at the top of the sensor hierarchy 306. Here, the LIDAR 136 and RF RADAR 134 may indicate the objects available to the object ID and positioning system 150.

FIG. 16 RW Aspect

Figure 16:
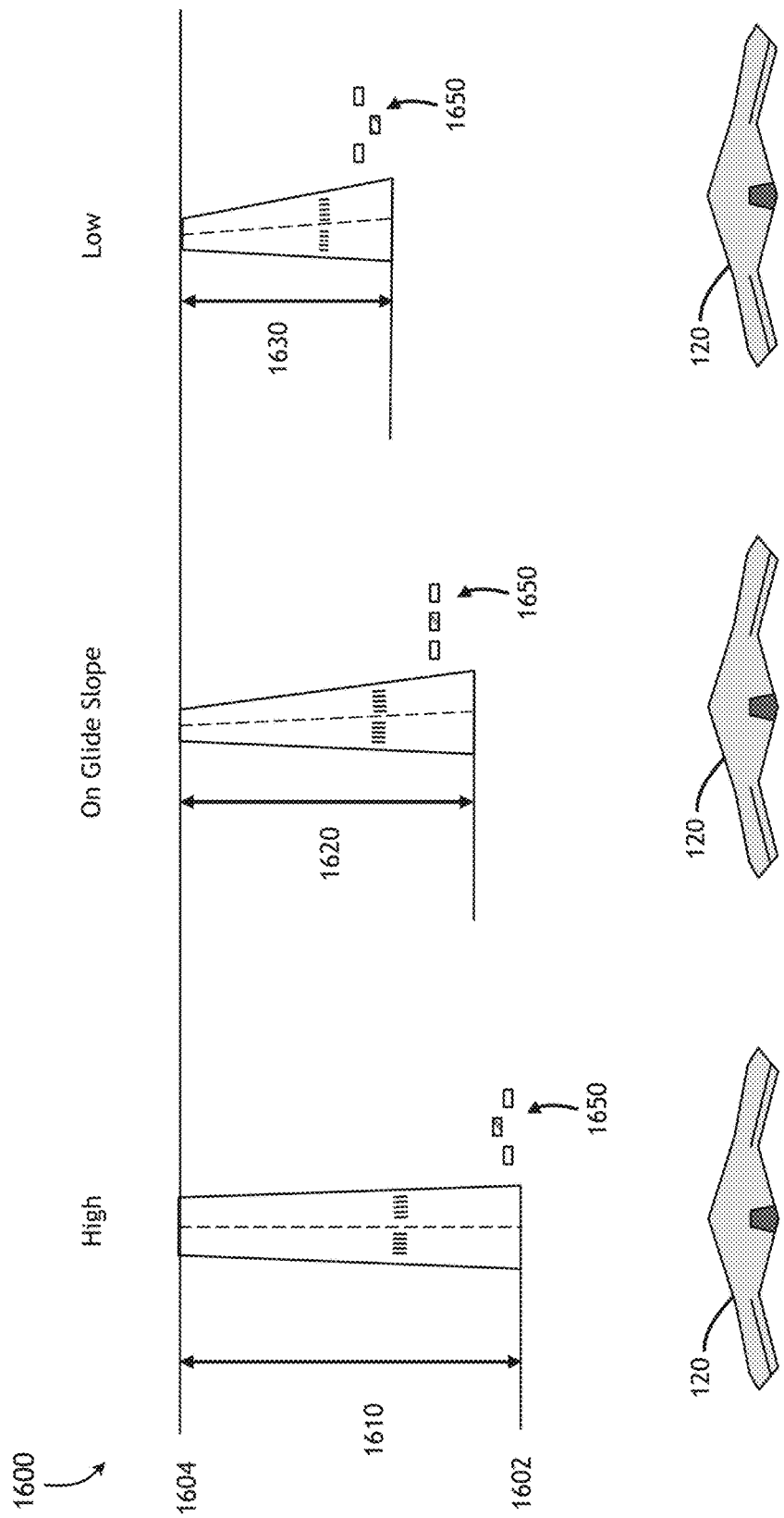
FIG. 16 is a diagram of runway aspect associated with one embodiment of the inventive concepts disclosed herein.

Referring now to FIG. 16, a diagram of runway aspect associated with one embodiment of the inventive concepts disclosed herein is shown. Runway aspect views 1600 may indicate an aspect view of a standard runway viewed from each of an above glide path aspect, a glide path aspect, and a below glide path aspect. One or more sensors may detect a runway trapezoid and objects which lead to the runway.

The object ID and positioning system 150 may extract the perimeter of the sensed object (runway taxiway thresholds) knowing the size of the object (runway length, slope, and width as a priori information) and determine the position of the autonomous aircraft 120 relative to the trapezoid and the aspect ratio of the sensed object as imaged by the sensor suite 130.

The object ID and positioning system 150 may derive a position solution based on a "runway reference frame" similar to how a human pilot may maneuver relative to a known object. For example, during landing on a runway or flying in formation, the object ID and positioning system 150 may analyze a totality of the objects within view and make decisions based on the aspect of the totality.

Here, one example may include a single dimension analysis of whether the autonomous aircraft 120 is high 1610, on glide slope 1620, or low 1630. As the dimension (primarily the length) attribute of the known runway outline is known, the object ID and positioning system 150 may determine a glide slope position relative to the runway based solely on the aspect of the runway. A difference in relative aspect of the approach end 1602 with departure end 1604 may indicate the vertical position of the autonomous aircraft 120 relative to the runway.

For example, if the difference in aspect of the approach end 1602 relative to the departure end 1604 is greater or less, the object ID and positioning system 150 may determine a glide slope based on the aspect distance 1620.

In addition, a visual glide slope indicator (VGSI) 1650 may indicate to a human pilot of a glide slope status. Here, the object ID and positioning system 150 may receive sensor data from one of the sensors within the sensor suite 130 and determine the same glide slope status that a human pilot would. In a low condition, the center panel of the VGSI 1650 may be aligned below the outside references while in a high condition, the center panel may be aligned above the two outside references. In this manner, the object ID and positioning system 150 may determine glideslope status and command an autopilot correction accordingly.

FIG. 17 Formation

Figure 17:
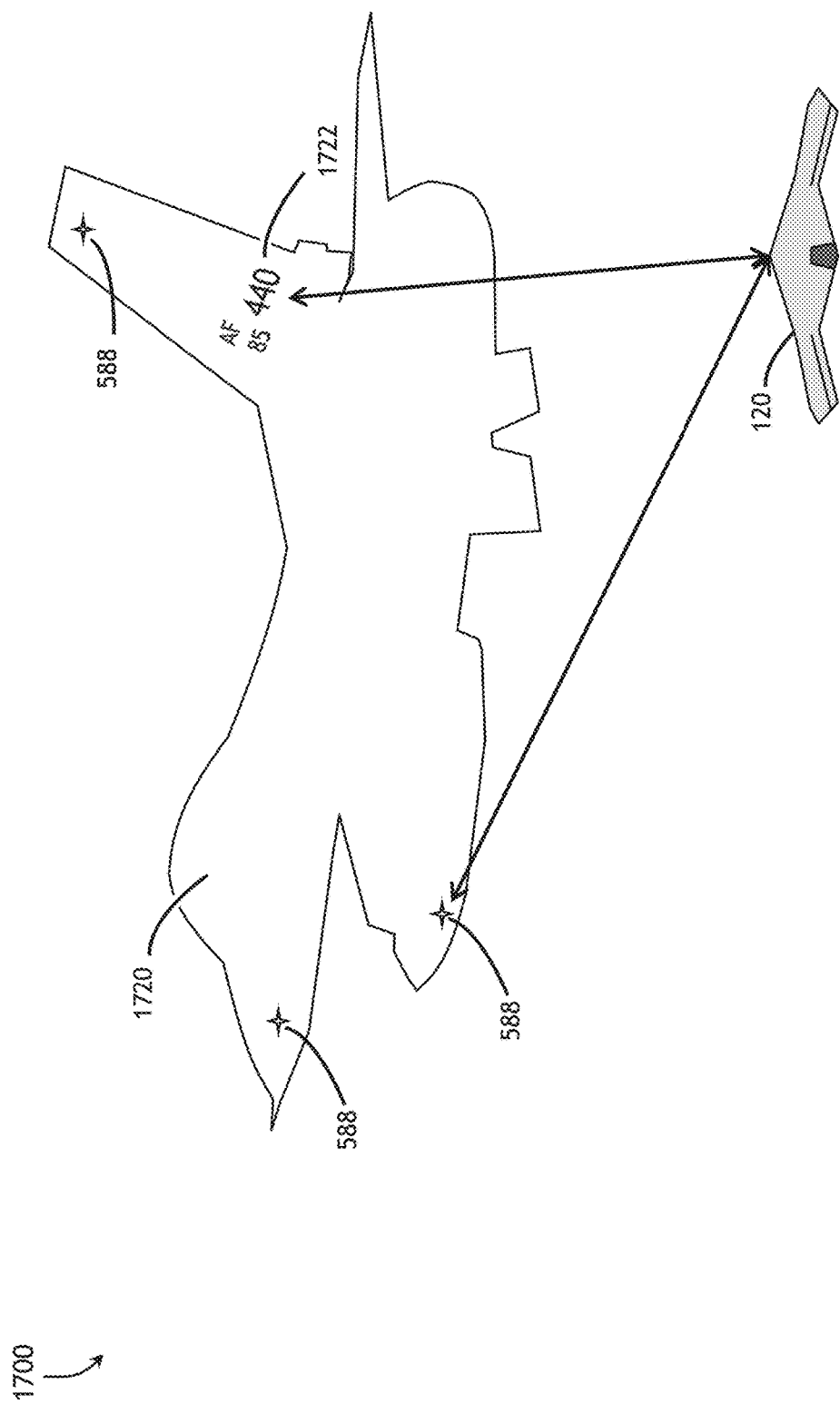
FIG. 17 is a diagram of a formation flight view associated with one embodiment of the inventive concepts disclosed herein.

Referring now to FIG. 17, a diagram of a formation flight view associated with one embodiment of the inventive concepts disclosed herein is shown. A formation flight view 1700 may indicate possible objects available to the object ID and positioning system 150 to maintain a position relative to destination object lead aircraft 1720. A constellation of sensor significant objects 588 placed on the destination object lead aircraft 1720 may aid the object ID and positioning system 150 in station keeping. As above, an optical sensor may image a lead aircraft ID number to verify the autonomous aircraft 120 is tracking the proper assigned lead aircraft 1720.

CONCLUSION

As will be appreciated from the above, a system and related method for configuring a suite of MS sensors to deliver high-performance sensor data to a processor driven ID and positioning system. The onboard systems may process the high-performance sensor data and determine and verify a position and trajectory usable by the advanced autonomous aircraft FMS for autonomous aircraft control.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system for multispectral sensor-based positioning, comprising:
a multispectral (MS) sensor suite onboard an autonomous aircraft including at least one of: a vision system (VS), a radio frequency (RF) radio detection and ranging (RADAR) system, and a laser imaging detection and ranging (LIDAR) system;
an object identification and positioning system associated with the MS sensor suite, the object identification and positioning system including at least one processor and a storage;
a MS database within the storage configured to communicate with the at least one processor, the MS database including a plurality of historical object data defining an associated plurality of objects the plurality of historical object data includes MS object data from at least two diverse spectra;
a tangible, non-transitory memory within the storage configured to communicate with the at least one processor, the tangible, non-transitory memory having instructions stored therein that, in response to execution by the at least one processor, cause the at least one processor to:
receive a flight plan, the flight plan including a desired path and a desired destination object;
receive sensor data from at least two sensors of the autonomous aircraft sensor suite, the sensor data being at least one first attribute of a sensed object within a first spectra and at least one second attribute of the sensed object within a second spectra, the first spectra diverse from the second spectra;
determine which sensors of the autonomous aircraft sensor suite are the at least two sensors based on a sensor hierarchy, the sensor hierarchy based at least on a flight analysis of the autonomous aircraft at least one of: an altitude, a mission, a speed and a sensor fidelity;
compare the received at least one first attribute and the at least one second attribute from the at least two sensors to the historical object data, the attribute comparison performed with no perspective transformation;
identify the sensed object if the at least one first attribute comparison or the at least one second attribute comparison results in a match;
determine one of a bearing, a range, and an altitude delta (BRA) between the identified object and the autonomous aircraft;
determine a position and a trajectory of the autonomous aircraft based on the identification of the sensed object and the BRA;
verify the position matches one of a path position associated with the desired path or a destination position associated with the desired destination object;
command an autopilot to manipulate at least one autonomous aircraft flight control based on one of the position, the trajectory, and the verification.

2. The system for multispectral sensor-based positioning of claim 1, wherein the VS further includes one of a color sensor, an infrared sensor, a temperature sensor, and a texture sensor.

3. The system for multispectral sensor-based positioning of claim 1, wherein the desired path includes a path comprising a plurality of desired objects usable as navigation aids along the desired path.

4. The system for multispectral sensor-based positioning of claim 1, wherein the desired destination object includes one of an airfield, a land-based landing surface, a sea-based landing surface, or an aircraft.

5. The system for multispectral sensor-based positioning of claim 1, wherein verify the position matches one of the desired path or the desired object further includes a verification of position based on one of an object attribute received via a second sensor data, an object attribute descriptive of a position of the object, and an object attribute representative of an appearance of the object to a sensor in a specific electromagnetic frequency band.

6. The system for multispectral sensor-based positioning of claim 1, wherein the VS further includes at least two stereoscopic cameras mounted externally on the autonomous aircraft.

7. The system for multispectral sensor-based positioning of claim 1, wherein the VS further includes an illuminator configured for transmission of a signal receivable by at least one sensor.

8. The system for multispectral sensor-based positioning of claim 1, wherein command an autopilot to manipulate at least one autonomous aircraft flight control based on the verification further includes commanding a maneuver to a predetermined altitude if the verification results in a non-match.

9. The system for multispectral sensor-based positioning of claim 1, wherein the at least one first or second attribute of the sensed object further comprises at least one of a shape, a size, a texture, a reflectivity level, a radar cross section, a color, or a three-dimensional position relative to a datum, the datum includes a vertical geodetic reference datum and a horizontal geodetic reference datum.

10. The system for multispectral sensor-based positioning of claim 1, wherein determine one of a BRA between the identified object and the autonomous aircraft further includes an analysis of a motion flow between a first sensed object and a second sensed object.

11. The system for multispectral sensor-based positioning of claim 1, wherein the sensed object includes at least one of a terrain object, a geographical object, a natural object, a man-made object, a MS runway identification, a navigation aid constellation, an airport prepared surface, a landing surface, a flight deck, an aircraft, or a target of interest.

12. The system for multispectral sensor-based positioning of claim 1, wherein identify the sensed object further comprises a comparison of the sensed at least one first or second attribute with the historical object data, the comparison including a percentage-based threshold match of a totality of object attributes.

13. The system for multispectral sensor-based positioning of claim 1, wherein a difference between the at least one first attribute and the at least one second attribute includes a diversity in at least one of a frequency, a wavelength, a temperature, and a bandwidth.

14. A method for multispectral sensor-based positioning of an autonomous aircraft, comprising:
receiving a flight plan, the flight plan including a desired path and a desired destination object;
receiving sensor data from at least two sensors of an autonomous aircraft sensor suite, the sensor data including at least one first attribute of a sensed object within a first spectra and at least one second attribute of the sensed object within a second spectra, the first spectra diverse from the second spectra;
determining which sensors of the autonomous aircraft sensor suite are the at least two sensors based on a sensor hierarchy, the sensor hierarchy based at least on a flight analysis of the autonomous aircraft at least one of: an altitude, a mission, a speed and a sensor fidelity;
comparing the received at least one first attribute and the at least one second attribute to a historical object data within an onboard multispectral database, the attribute comparing performed with no perspective transformation;
identifying the sensed object if the at least one first or second attribute comparison results in a match;
determining one of a bearing, a range, and an altitude delta (BRA) between the identified object and the autonomous aircraft;
determining a position and a trajectory of the autonomous aircraft based on the identification of the sensed object and the BRA;
verifying the position matches one of the desired path or the desired destination object;
commanding an autopilot to manipulate at least one autonomous aircraft flight control based on one of the position, the trajectory, and the verification.

15. The method for multispectral sensor-based positioning of an autonomous aircraft of claim 14, wherein verifying the position matches one of the desired path or the desired object further includes a verification of position based on one of an object attribute received via a second sensor data, an object attribute descriptive of a position of the object, and an object attribute representative of an appearance of the object to a sensor in a specific electromagnetic frequency band.

16. The method for multispectral sensor-based positioning of an autonomous aircraft of claim 14, wherein receiving sensor data from at least one sensor further comprises a phase of flight analysis and a determination of a sensor hierarchy, each based on at least one of an altitude, a mission, a speed, and a sensor fidelity.

* * * * *